United States Patent
Chen et al.

(10) Patent No.: US 10,218,457 B2
(45) Date of Patent: Feb. 26, 2019

(54) TECHNIQUES FOR IMPROVING FEEDBACK PROCESSES BASED ON A LATENCY BETWEEN A TRANSMISSION TIME INTERVAL (TTI) AND A FEEDBACK OPPORTUNITY

(71) Applicant: QUALCOMM Incorporated, San Diego, CA (US)

(72) Inventors: Wanshi Chen, San Diego, CA (US);
Peter Gaal, San Diego, CA (US);
Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 15/052,295

(22) Filed: Feb. 24, 2016

(65) Prior Publication Data

US 2017/0064726 A1   Mar. 2, 2017

Related U.S. Application Data

(60) Provisional application No. 62/209,172, filed on Aug. 24, 2015.

(51) Int. Cl.
| | |
|---|---|
| *H04L 1/00* | (2006.01) |
| *H04L 1/18* | (2006.01) |
| *H04L 5/00* | (2006.01) |

(52) U.S. Cl.
CPC .......... *H04L 1/0015* (2013.01); *H04L 1/0027* (2013.01); *H04L 1/1861* (2013.01); *H04L 1/1887* (2013.01); *H04L 5/0044* (2013.01)

(58) Field of Classification Search
CPC ... H04L 1/0015; H04L 1/0027; H04L 1/1861; H04L 1/1887; H04L 5/0044; H04W 72/0446
See application file for complete search history.

(56) References Cited

U.S. PATENT DOCUMENTS

| 9,131,498 B2 | 9/2015 | Au et al. | |
|---|---|---|---|
| 2003/0108027 A1* | 6/2003 | Kim | H04L 1/1854 370/345 |

(Continued)

FOREIGN PATENT DOCUMENTS

| CN | 105099629 A | 11/2015 |
|---|---|---|
| WO | WO-2006057992 A2 | 6/2006 |

(Continued)

OTHER PUBLICATIONS

Ericsson, "Study of shorter TTI for Latency Reduction", 3GPP TSG-RAN WG2 Meeting #91, R2-153493, Beijing, China, Aug. 24-28, 2015, 5 pgs., XP050993915, 3rd Generation Partnership Project.

(Continued)

*Primary Examiner* — Steven H Nguyen
(74) *Attorney, Agent, or Firm* — Holland & Hart LLP

(57) ABSTRACT

Techniques are described for wireless communication. One method includes identifying a latency between a start of a transmission time interval (TTI) of a transmission burst and a feedback opportunity for the TTI, and determining a duration of the TTI based at least in part on the latency. Another method includes identifying a latency between an end of a TTI of a transmission burst and a feedback opportunity for the TTI, identifying a plurality of code blocks in the TTI, selecting one of a transport block level feedback or a code block level feedback for the TTI based at least in part on the latency, and transmitting the selected one of the transport block level feedback or the code block level feedback for the TTI during the feedback opportunity.

30 Claims, 14 Drawing Sheets

(56) References Cited

U.S. PATENT DOCUMENTS

| | | | |
|---|---|---|---|
| 2004/0042492 A1 | 3/2004 | Suzuki et al. | |
| 2005/0122898 A1* | 6/2005 | Jang | H04L 1/1819 370/218 |
| 2006/0114975 A1* | 6/2006 | Li | H04L 1/1854 375/219 |
| 2007/0064669 A1* | 3/2007 | Classon | H04L 1/1822 370/347 |
| 2007/0195820 A1* | 8/2007 | So | H04L 1/0007 370/470 |
| 2010/0260164 A1* | 10/2010 | Moon | H04L 5/0007 370/345 |
| 2011/0182248 A1* | 7/2011 | Fan | H04L 47/14 370/329 |
| 2011/0211522 A1* | 9/2011 | Chung | H04L 1/1822 370/315 |
| 2011/0268003 A1* | 11/2011 | Li | H04W 52/0216 370/311 |
| 2014/0071954 A1* | 3/2014 | Au | H04W 72/0446 370/336 |
| 2015/0039958 A1* | 2/2015 | Vos | H04L 1/1819 714/748 |
| 2015/0333878 A1* | 11/2015 | Yu | H04L 1/1893 370/329 |
| 2016/0113031 A1* | 4/2016 | Sun | H04W 28/26 370/336 |
| 2016/0269150 A1 | 9/2016 | Jiang et al. | |

FOREIGN PATENT DOCUMENTS

| | | |
|---|---|---|
| WO | WO2013138779 A1 | 9/2013 |
| WO | WO-2016040290 A1 | 3/2016 |

OTHER PUBLICATIONS

ISA/EP, International Search Report and Written Opinion of the International Searching Authority, Int'l Application No. PCT/US2016/048232, dated Nov. 29, 2016, European Patent Office, Rijswijk, NL, 16 pgs.

LG Electronics: "Restriction on Maximum Number of Transport Channel Bits", 3GPP TSG RAN WG1 Meeting #70, R1-123533, Qingdao, China, Aug. 13-17, 2012, 3 pgs., XP050661411, 3rd Generation Partnership Project.

Han J., et al., "Principle and Performance of TTI Bundling for VoIP in LTE FDD Mode," IEEE Wireless Communications and Networking Conference, 2009, 6 pages.

Yang F., et al., "Adaptive Transmission of VoIP Packets using TTI Bundling in LTE Uplink," 48th Annual Conference on Information Sciences and Systems (CISS), 2014, pp. 1-5.

\* cited by examiner

TECHNIQUES FOR IMPROVING FEEDBACK PROCESSES BASED ON A LATENCY BETWEEN A TRANSMISSION TIME INTERVAL (TTI) AND A FEEDBACK OPPORTUNITY

CROSS REFERENCES

The present Application for Patent claims priority to U.S. Provisional Patent Application No. 62/209,172 by Chen et al., entitled "Techniques For Improving Feedback Processes Based On A Latency Between A Transmission Time Interval (TTI) And A Feedback Opportunity," filed Aug. 24, 2015, assigned to the assignee hereof, and expressly incorporated by reference herein.

BACKGROUND

Field of the Disclosure

The present disclosure, for example, relates to wireless communication systems, and more particularly to techniques for improving feedback processes based on a latency between a transmission time interval (TTI) and a feedback opportunity for the TTI.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may include the transmission of feedback for downlink (DL) transmissions or uplink (UL) transmissions. In such communication modes, a feedback opportunity provided for a base station or UE to transmit feedback may need to be delayed to give the base station or UE time to process a transmission and prepare the feedback.

SUMMARY

The present disclosure, for example, relates to wireless communication systems, and more particularly to techniques for improving feedback processes based on a latency between a TTI and a feedback opportunity for the TTI. In some aspects, the disclosed techniques enable a transmitting apparatus to select TTI durations that make it easier for a receiving apparatus to prepare feedback for the TTIs. In some aspects, the disclosed techniques enable a receiving apparatus to verify that a duration of a TTI signaled by a transmitting apparatus is an appropriate duration that allows the receiving apparatus to prepare feedback for the TTI. In some aspects, the disclosed techniques enable a receiving apparatus to select transport block level feedback or code block level feedback for a TTI, depending on which type of feedback is more appropriate given a latency between an end of the TTI and a feedback opportunity for the TTI.

A method for wireless communication is described. The method may include identifying a latency between a start of a TTI of a transmission burst and a feedback opportunity for the TTI, and determining a duration of the TTI based at least in part on the latency.

An apparatus for wireless communication is described. The apparatus may include means for identifying a latency between a start of a TTI of a transmission burst and a feedback opportunity for the TTI, and means for determining a duration of the TTI based at least in part on the latency.

Another apparatus is described. The apparatus may include a processor, and memory coupled to the processor. The processor may be configured to identify a latency between a start of a TTI of a transmission burst and a feedback opportunity for the TTI, and to determine a duration of the TTI based at least in part on the latency.

A non-transitory computer readable medium for wireless communication is described. The non-transitory computer-readable medium may include instructions to cause a processor to identify a latency between a start of a TTI of a transmission burst and a feedback opportunity for the TTI and determine a duration of the TTI based at least in part on the latency.

In some examples of the method, apparatuses, or non-transitory computer-readable medium described above, the TTI may include a last TTI of the transmission burst. In some examples of the method, apparatuses, or non-transitory computer-readable medium described above, the determining may include selecting the duration of the TTI based at least in part on the latency. Some examples of the method, apparatuses, or non-transitory computer-readable medium described above may further include processes, features, means, or instructions for determining the latency does not satisfy a threshold latency, and restricting the selecting, based at least in part on the latency not satisfying the threshold latency, to a subset of one or more durations less than a maximum TTI duration.

Some examples of the method, apparatuses, or non-transitory computer-readable medium described above may further include processes, features, means, or instructions for selecting at least one of a modulation and coding scheme (MC S) or a transport block (TB) size for the TTI independently of the duration of the TTI. Some examples of the method, apparatuses, or non-transitory computer-readable medium described above may further include processes, features, means, or instructions for selecting at least one of an MCS or a TB size for the TTI based at least in part on the duration of the TTI.

Some examples of the method, apparatuses, or non-transitory computer-readable medium described above may further include processes, features, means, or instructions for capping an MCS or a TB size for the TTI based at least in part on the latency. Some examples of the method, apparatuses, or non-transitory computer-readable medium described above may further include processes, features, means, or instructions for transmitting at least one of a control channel or a reference signal for the TTI during a preceding TTI of the transmission burst. Some examples of the method, apparatuses, or non-transitory computer-readable medium described above may further include processes, features, means, or instructions for repeating the identifying and the selecting for each of a plurality of TTIs in the transmission burst.

In some examples of the method, apparatuses, or non-transitory computer-readable medium described above, a first restricted duration may be selected for a first TTI in the plurality of TTIs and a second restricted duration may be selected for a second TTI in the plurality of TTIs, where the first restricted duration differs from the second restricted duration. In some examples of the method, apparatuses, or non-transitory computer-readable medium described above, the determined duration may include an expected duration of the TTI, and the method, apparatuses, or non-transitory computer-readable medium described above may further include processes, features, means, or instructions for identifying an actual duration of the TTI and modifying feedback for the TTI when the latency does not satisfy a threshold latency and the actual duration of the TTI is greater than the expected duration of the TTI.

Some examples of the method, apparatuses, or non-transitory computer-readable medium described above may further include processes, features, means, or instructions for monitoring at least one of a control channel or scheduling information received from a base station, and the actual duration of the TTI may be identified based at least in part on the monitoring. In some examples of the method, apparatuses, or non-transitory computer-readable medium described above, modifying feedback for the TTI may include refraining from transmitting feedback for the TTI during the feedback opportunity.

A method for wireless communication is described. The method may include identifying a latency between an end of a TTI of a transmission burst and a feedback opportunity for the TTI, identifying a plurality of code blocks in the TTI, selecting one of a transport block level feedback or a code block level feedback for the TTI based at least in part on the latency, and transmitting the selected one of the transport block level feedback or the code block level feedback for the TTI during the feedback opportunity.

An apparatus for wireless communication is described. The apparatus may include means for identifying a latency between an end of a TTI of a transmission burst and a feedback opportunity for the TTI, identifying a plurality of code blocks in the TTI, selecting one of a transport block level feedback or a code block level feedback for the TTI based at least in part on the latency, and transmitting the selected one of the transport block level feedback or the code block level feedback for the TTI during the feedback opportunity.

Another apparatus is described. The apparatus may include a processor, and memory coupled to the processor. The processor may be configured to identify a latency between an end of a TTI of a transmission burst and a feedback opportunity for the TTI, identify a plurality of code blocks in the TTI, select one of a transport block level feedback or a code block level feedback for the TTI based at least in part on the latency, and transmit the selected one of the transport block level feedback or the code block level feedback for the TTI during the feedback opportunity.

A non-transitory computer readable medium for wireless communication is described. The non-transitory computer-readable medium may include instructions to cause a processor to identify a latency between an end of a TTI of a transmission burst and a feedback opportunity for the TTI, identify a plurality of code blocks in the TTI, select one of a transport block level feedback or a code block level feedback for the TTI based at least in part on the latency, and transmit the selected one of the transport block level feedback or the code block level feedback for the TTI during the feedback opportunity.

In some examples of the method, apparatuses, or non-transitory computer-readable medium described above, the code block level feedback may be selected, and transmitting the code block level feedback for the TTI during the feedback opportunity may include transmitting a default acknowledgement or a default non-acknowledgement of at least one code block that is not processed in time to report feedback during the feedback opportunity. In some examples of the method, apparatuses, or non-transitory computer-readable medium described above, the code block level feedback may be selected, and transmitting the code block level feedback for the TTI during the feedback opportunity may include transmitting an acknowledgement or a non-acknowledgement for a first set of one or more code blocks that is not processed in time to report feedback during the feedback opportunity, where the acknowledgement or non-acknowledgement is based at least in part on an acknowledgement or non-acknowledgement of at least one code block that is processed in time to report feedback during the feedback opportunity.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which feedback processes are based on a latency between a TTI and a feedback opportunity for the TTI. The techniques may be applied to various wireless communication environments, and are useful because they may enable a receiving apparatus (e.g., a UE or base station) to provide feedback (e.g., hybrid automatic repeat request (HARQ) feedback) under conditions in which a TTI-to-feedback opportunity latency is relatively short.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instafnce, the methods described may be performed in an order different from that described, and various steps may be added, omitted, or combined. Also, features described with respect to some examples may be combined in other examples.

Figure 1:
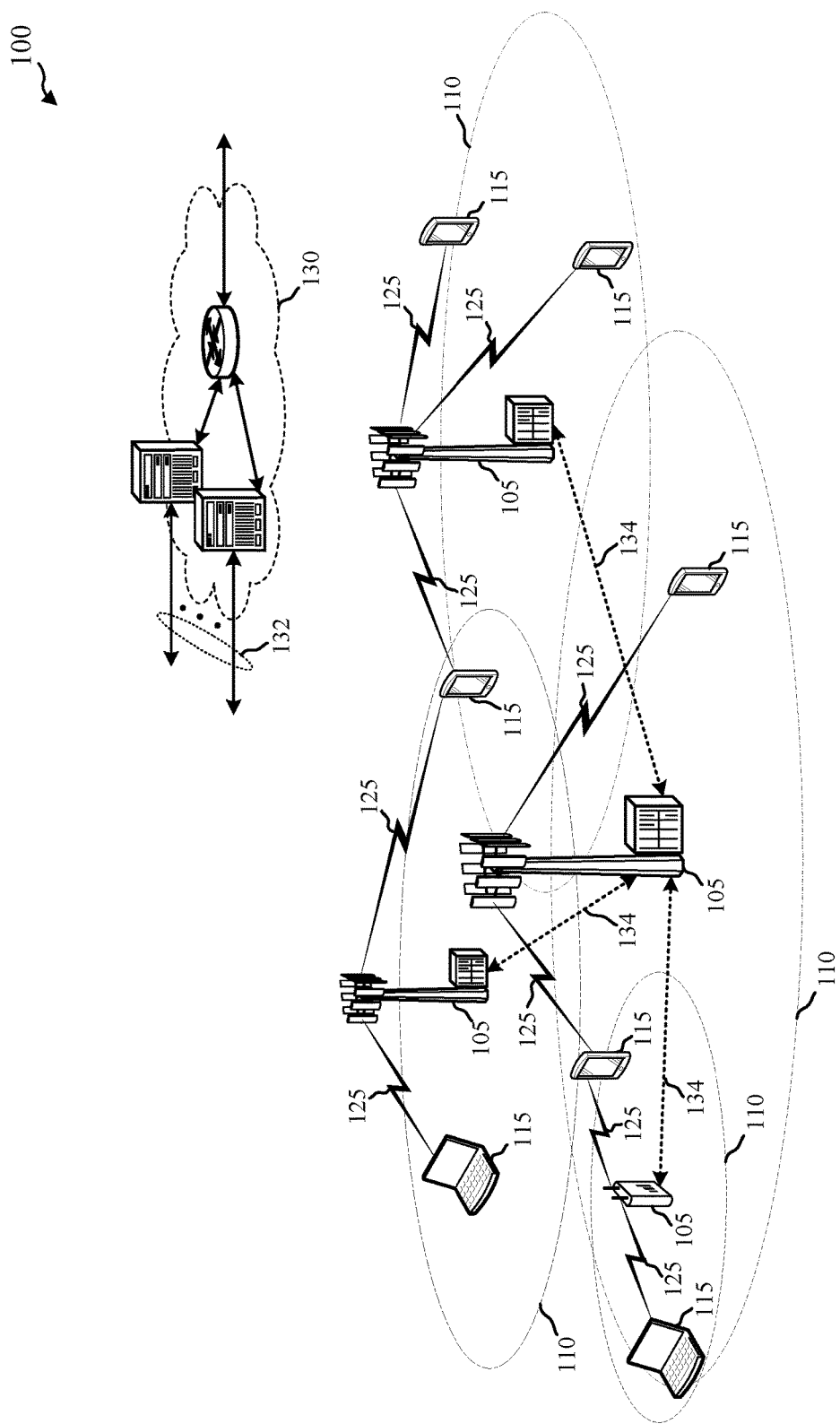
FIG. 1 illustrates an example of a wireless communication system in accordance with various aspects of the present disclosure.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, interne protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, X2, etc.), which may be wired or wireless communication links.

The base stations 105 may wirelessly communicate with the UEs 115 via one or more antennas. In some examples, the one or more antennas may include one or more base station antennas (and transceivers) co-located with base station servers and/or one or more remote radio head (RRH) antennas (and transceivers) located remotely from base station servers. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB (HNB), a Home eNodeB, or some other suitable terminology. The geographic coverage area 110 for a base station 105 may be divided into sectors making up only a portion of the coverage area (not shown). The geographic coverage area(s) 110 of for one or more base stations 105 may define a zone of the wireless communication system 100. The wireless communication system 100 may include base stations 105 of different types (e.g., macro or small cell base stations). There may be overlapping geographic coverage areas 110 for different technologies.

In some examples, the wireless communication system 100 may be or include a long term evolution (LTE) or LTE-Advanced (LTE-A) network. The wireless communication system 100 may also be or include a next generation network, such as a 5G wireless communication network. In LTE/LTE-A and 5G networks, the term evolved node B (eNB) may be generally used to describe the base stations 105, while the term UE may be generally used to describe the UEs 115. The wireless communication system 100 may be a heterogeneous LTE/LTE-A or 5G network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 115 with service subscriptions with the network provider. A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use HARQ feedback to provide retransmission at the MAC layer to improve link efficiency. HARQ feedback in a 4G LTE/LTE-A network may be transmitted 4 milliseconds (ms) after receiving a TTI (e.g., a subframe), for either a DL transmission (e.g., a transmission on a physical downlink shared channel (PDSCH)) or a UL transmission (e.g., a transmission on a physical uplink shared channel (PUSCH)). HARQ feedback in an evolved LTE/LTE-A network (e.g., a 5G LTE/LTE-A network) may be transmitted quicker than HARQ feedback in a 4G LTE/LTE-A network. For example, HARQ may be transmitted four symbol periods after receiving a TTI (e.g., a symbol period) including a DL transmission or UL transmission. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a smart phone, a personal digital assistant (PDA), a wireless modem, a wireless communication device, a handheld device, a tablet computer, a laptop computer, a cordless phone, a wireless local loop (WLL) station, a data card, a Universal Serial Bus (USB) dongle, a wireless router, etc. A UE 115 may be able to communicate with various types of base stations and network equipment including macro eNBs, small cell eNBs, relay base stations, and the like. As a UE 115 moves within the wireless communication system 100, the UE 115 may move from cell to cell or from zone to zone (with a zone including one or more cells). When the wireless communication system 100 is deployed as a UE-centric network, a UE 115 may move from cell to cell within a zone without a physical channel reconfiguration, with the network providing data transfer services via the same radio resources despite a change in the UE's serving cell.

The wireless communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each of the wireless communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The wireless communication links 125 may transmit bidirectional communications using frequency division duplex (FDD) (e.g., using paired spectrum resources) or time division duplex (TDD) (e.g., using unpaired spectrum resources) operation. Frame structures may be defined for FDD (e.g., frame structure type 1) and TDD (e.g., frame structure type 2).

In some embodiments of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques (e.g., any MIMO but not massive MIMO (e.g. multi-antenna MIMO and multi-user MIMO) techniques or massive MIMO techniques) that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
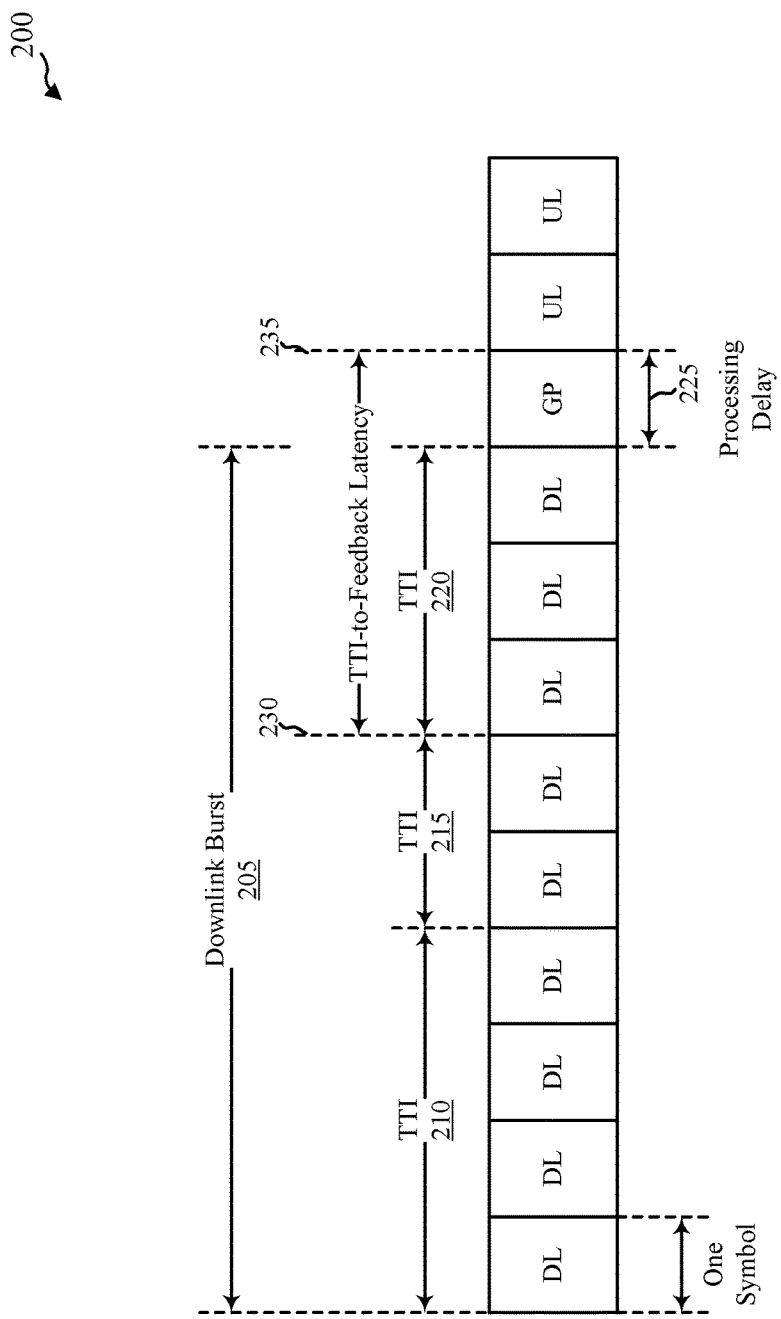
FIG. 2 shows a timing diagram including a number of symbol periods over which a transmission burst may be transmitted, followed by a symbol period used as a guard period, followed by a number of symbol periods in which feedback for the transmission burst may be transmitted, in accordance with various aspects of the present disclosure.

FIG. 2 shows a timing diagram 200 including a number of symbol periods over which a transmission burst may be transmitted, followed by a symbol period used as a guard period, followed by a number of symbol periods in which feedback for the transmission burst may be transmitted, in accordance with various aspects of the present disclosure. In some examples (as shown), the transmission burst may be a downlink burst 205 transmitted by a base station during a number of downlink (DL) symbol periods, and the feedback (e.g., HARQ feedback or scheduling requests) may be transmitted by a UE during a number of uplink (UL) symbol periods. In other examples (not shown), the transmission burst may be an uplink burst transmitted by a UE during a number of UL symbol periods, and the feedback (e.g., HARQ feedback or UL grants) may be transmitted by a base station during a number of DL symbol periods. The base station may be an example of aspects of one or more of the base stations 105 described with reference to FIG. 1, and the UE may be an example of aspects of one or more of the UEs 115 described with reference to FIG. 1.

By way of example, the downlink burst 205 is shown to be transmitted over nine DL symbol periods. In other examples, a downlink burst (or transmission burst in general) may be transmitted over more or fewer DL symbol periods. Also by way of example, the guard period (GP) is shown to include one GP symbol period. In other examples, the GP may include more than one GP symbol period. By way of further example, the number of UL symbol periods is shown to include two UL symbol periods. In other examples, the number of uplink symbol periods may include more or fewer UL symbol periods.

The downlink burst 205 is shown to include a number of TTIs. By way of example, the downlink burst 205 is shown to include a first TTI 210 having a duration of four DL symbol periods, a second TTI 215 having a duration of two DL symbol periods, and a third TTI 220 having a duration of three DL symbol periods. In some examples, a base station may select a duration of each of the TTIs based on the nature (e.g., sizes) of the transmissions included in the downlink burst. The base station may additionally or alternatively select the durations of the TTIs based on other factors.

Before transmitting feedback for a TTI (e.g., the third TTI 220), a UE may process all, or at least a portion of, a transmission received during the TTI. When the processing time 225 available to the UE between receipt of the transmission (e.g., at time 230) and a feedback opportunity for the TTI (e.g., a feedback opportunity during the first UL symbol period following the guard period, at time 235) is too small, the UE may be unable to generate and transmit feedback for the TTI during the feedback opportunity. To address this, the base station may consider the time it takes the UE to process the transmission, and may schedule the feedback opportunity (or increase the duration of the guard period) to give the UE time to process enough of the transmission to generate and transmit feedback during the feedback opportunity (e.g., at time 235). However, the time it takes the UE to process a transmission during a TTI of longer duration may be longer than desired, and may delay the transmission of feedback for the TTI. Furthermore, when the feedback for a set of TTIs (or for all TTIs) of a downlink burst is transmitted during a single feedback opportunity, delaying the feedback opportunity to enable transmission of feedback for a last TTI of the set (e.g., a last TTI of the downlink burst) may delay the transmission of feedback for all of the TTIs of the downlink burst.

Figure 3:
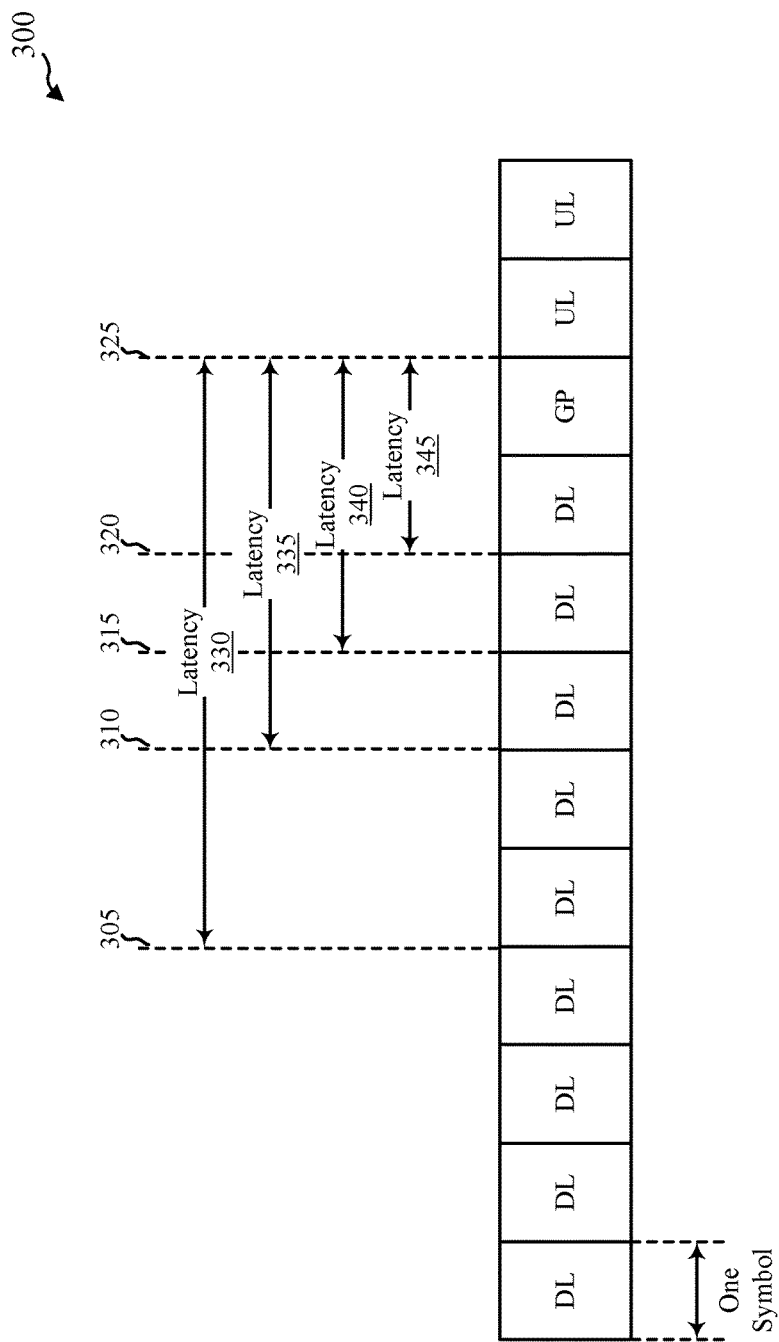
FIG. 3 shows a timing diagram including a number of symbol periods over which a transmission burst may be transmitted, followed by a symbol period used as a guard period, followed by a number of symbol periods in which feedback for the transmission burst may be transmitted, in accordance with various aspects of the present disclosure.

In some examples, the time it takes the UE to process enough of a last transmission (or last transmissions) of a downlink burst, and generate feedback for the associated TTI(s), may be reduced by improving the UE's hardware or software capabilities. However, such improvements may be associated with undesirable cost, increased power use, etc. In some examples, the time it takes the UE to process enough of a last transmission (or last transmissions) of a downlink burst, and generate feedback for the associated TTI(s), may be reduced by reducing an MCS or a TB size of the last transmission(s). However, when the MCS or TB size is reduced below a maximum MCS or TB size supported by a channel, throughput may be adversely affected and transmission efficiency may be decreased. FIG. 3 shows an alternative way to reduce the time it takes a UE to process enough of a last transmission (or last transmissions) of a downlink burst (or of a transmission burst in general) and generate feedback.

FIG. 3 shows a timing diagram 300 including a number of symbol periods over which a transmission burst may be transmitted, followed by a symbol period used as a guard period, followed by a number of symbol periods in which feedback for the transmission burst may be transmitted, in accordance with various aspects of the present disclosure. In some examples (as shown), the number of symbol periods over which a transmission burst may be transmitted may include a number of DL symbol periods, and the number of symbol periods in which feedback (e.g., HARQ feedback or scheduling requests) for the transmission burst may be transmitted may include a number of UL symbol periods. In other examples (not shown), the number of symbol periods over which a transmission burst may be transmitted may include a number of UL symbol periods, and the number of symbol periods in which feedback (e.g., HARQ feedback or UL grants) for the transmission burst may be transmitted may include a number of DL symbol periods.

A downlink burst may be transmitted by a base station during a number of DL symbol periods, and feedback for the downlink burst may be transmitted by a UE during a number of UL symbol periods. The downlink burst may also schedule an uplink burst during the number of UL symbol periods. An uplink burst may be transmitted by a UE during a number of UL symbol periods, and feedback for the uplink burst may be transmitted by a base station during a number of DL symbol periods. The base station may be an example of aspects of one or more of the base stations 105 described with reference to FIG. 1, and the UE may be an example of aspects of one or more of the UEs 115 described with reference to FIG. 1.

When scheduling or formatting a downlink burst over the DL symbol periods shown in FIG. 3, a base station may determine a duration of a next TTI of the downlink burst by identifying a latency between a start of the TTI and a feedback opportunity for the TTI, and determining the duration of the TTI based at least in part on the latency. For example, when scheduling or formatting a TTI beginning at time 305, the base station may identify a latency 330 between the time 305 and a feedback opportunity at time 325. The base station may determine that the latency 330 satisfies (e.g., is greater than) a threshold latency and select a duration of the TTI without restriction (e.g., because a TTI of any allowable duration may be processed by a UE in time to generate and transmit feedback during the feedback opportunity at time 325).

When scheduling or formatting a TTI beginning at time 310, the base station may identify a latency 335 between the time 310 and the feedback opportunity at time 325. The base station may determine that the latency 335 does not satisfy (e.g., is less than or equal to) a threshold latency and restrict the selection of a duration of the TTI (e.g., because a TTI having too long of a duration may not be processed by a UE in time to generate and transmit feedback during the feedback opportunity at time 325). In some examples, the duration of a TTI beginning at time 310 may be restricted to a subset of one or more durations less than a maximum TTI duration. For example, the duration of a TTI beginning at time 310 may be restricted to a duration of one or two DL symbol periods.

When scheduling or formatting a TTI beginning at time 315 or time 320, the base station may identify a latency 340 between the time 315 and the feedback opportunity at time 325 or a latency 345 between the time 320 and the feedback opportunity at time 325. The base station may determine that the latency 340 or 345 does not satisfy (e.g., is less than or equal to) a threshold latency and restrict the selection of a duration of the TTI (e.g., because a TTI having too long of a duration may not be processed by a UE in time to generate and transmit feedback during the feedback opportunity at time 325). In some examples, the duration of a TTI beginning at time 315 or 320 may be restricted to a subset of one or more durations less than a maximum TTI duration. For example, the duration of a TTI beginning at time 315 or 320 may be restricted to a duration of one DL symbol period.

In some examples, an MCS or a TB size for a TTI beginning at time 305, 310, 315, or 320 may be selected without restriction, regardless of whether selection of the TTI's duration is restricted (e.g., the MCS or TB size of the TTI may be selected based on channel/interference conditions, independently of the duration of the TTI). In other examples, an MCS or a TB size for a TTI having a restricted duration may be selected based at least in part on the restricted duration. In other examples, an MCS or a TB size for a TTI having a restricted duration may be capped based at least in part on the latency between the start of the TTI and a feedback opportunity for the TTI.

As shown in FIG. 3, restrictions on the duration of a TTI may vary depending on the latency between the start of the TTI and a feedback opportunity for the TTI. In some examples, the process described with reference to FIG. 3 for selecting the durations of TTIs may result in a duration of a last TTI of a downlink burst (or more generally, a transmission burst) being restricted. In some examples, the process may result in durations of a set of last TTIs of a downlink burst (or more generally, a transmission burst) being restricted.

In some examples, a base station may transmit a control channel or reference signal for a TTI having a restricted duration at a beginning of the TTI or during a preceding TTI. Such an early transmission of the control channel or reference signal may enable an earlier channel estimation or interference estimation for the TTI, by a UE, and may enable a faster processing (e.g., demodulation) of a transmission received at the UE during the TTI.

A UE that receives a downlink burst may independently identify a latency between a start of a TTI and a feedback opportunity for the TTI, and may determine an expected duration for the TTI based at least in part on the latency. The UE may also identify an actual duration of the TTI (e.g., based on monitoring at least one of a control channel or scheduling information received from a base station, or blindly). When the latency does not satisfy a threshold latency, the UE may determine whether the actual duration of the TTI is greater than the expected duration of the TTI. When the actual duration of the TTI is greater than the expected duration of the TTI, the UE may modify feedback for the TTI. In some examples, modifying feedback for the TTI may include refraining from transmitting feedback for the TTI during the feedback opportunity for the TTI. In other examples, modifying feedback for the TTI may include treating an assigned TTI as an invalid assignment, and consequently, refraining from decoding the TTI and refraining from providing the corresponding feedback for the TTI.

Figure 4:
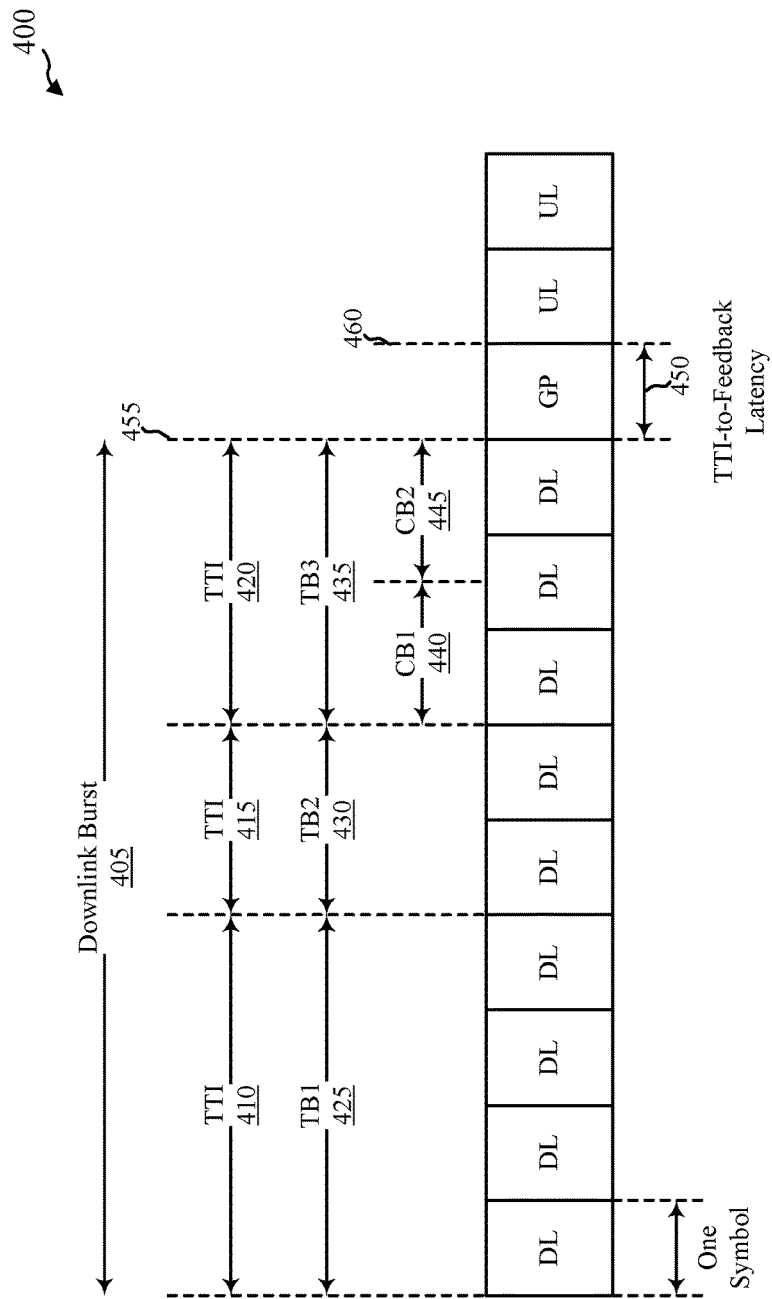
FIG. 4 shows a timing diagram including a number of symbol periods over which a transmission burst may be transmitted, followed by a symbol period used as a guard period, followed by a number of symbol periods in which feedback for the transmission burst may be transmitted, in accordance with various aspects of the present disclosure.

FIG. 4 shows a timing diagram 400 including a number of symbol periods over which a transmission burst may be transmitted, followed by a symbol period used as a guard period, followed by a number of symbol periods in which feedback for the transmission burst may be transmitted, in accordance with various aspects of the present disclosure. In some examples (as shown), the transmission burst may be a downlink burst 405 transmitted by a base station during a number of DL symbol periods, and the feedback (e.g., HARQ feedback or scheduling requests) may be transmitted by a UE during a number of UL symbol periods. In other examples (not shown), the transmission burst may be an uplink burst transmitted by a UE during a number of UL symbol periods, and the feedback (e.g., HARQ feedback or UL grants) may be transmitted by a base station during a number of DL symbol periods. The base station may be an example of aspects of one or more of the base stations 105 described with reference to FIG. 1, and the UE may be an example of aspects of one or more of the UEs 115 described with reference to FIG. 1.

By way of example, the downlink burst 405 is shown to be transmitted over nine DL symbol periods. In other examples, a downlink burst (or transmission burst in general) may be transmitted over more or fewer DL symbol periods. Also by way of example, the GP is shown to include one GP symbol period. In other examples, the GP may include more than one GP symbol period. By way of further example, the number of UL symbol periods is shown to include two UL symbol periods. In other examples, the number of uplink symbol periods may include more or fewer UL symbol periods.

The downlink burst 405 is shown to include a number of TTIs. By way of example, the downlink burst 405 is shown to include a first TTI 410 having a duration of four DL symbol periods, a second TTI 415 having a duration of two DL symbol periods, and a third TTI 420 having a duration of three DL symbol periods. In some examples, a base station may select a duration of each of the TTIs based on the nature (e.g., sizes) of the transmissions included in the downlink burst. The base station may additionally or alternatively select the durations of the TTIs based on other factors.

Each of the TTIs shown in FIG. 4 may be associated with a transport block. For example, the first TTI 410 may be associated with a first transport block (TB1) 425, the second TTI 415 may be associated with a TB2 430, and the third TTI 420 may be associated with a TB3 435. Each of the TTIs may also be associated with one or more code blocks. For example, the third TTI 420 may be associated with a first code block (CB1) 440 and a CB2 445.

In some examples, a UE may identify a latency 450 between an end of a TTI (e.g., an end of the third TTI 420, at time 455) and a feedback opportunity for the TTI (e.g., a feedback opportunity at time 460). The UE may also identify the code blocks (e.g., CB1 440 and CB2 445) in the TTI. The UE may then select one of a transport block level feedback or a code block level feedback for the TTI based at least in part on the latency. For example, the UE may select the transport block level feedback when the latency is greater than a threshold latency, and transmit the code block level feedback when the latency is less than or equal to the threshold latency.

In some examples, transmitting code block level feedback may include transmitting a default acknowledgement or a default non-acknowledgement of at least one code block that is not processed in time to report feedback during the feedback opportunity at time 460. In some examples, transmitting code block level feedback may include transmitting an acknowledgement or a non-acknowledgement for a first set of one or more code blocks that is not processed in time to report feedback during the feedback opportunity at time 460. The acknowledgement or non-acknowledgement may be based at least in part on an acknowledgement or non-acknowledgement of at least one code block that is processed in time to report feedback during the feedback opportunity.

Figure 5:
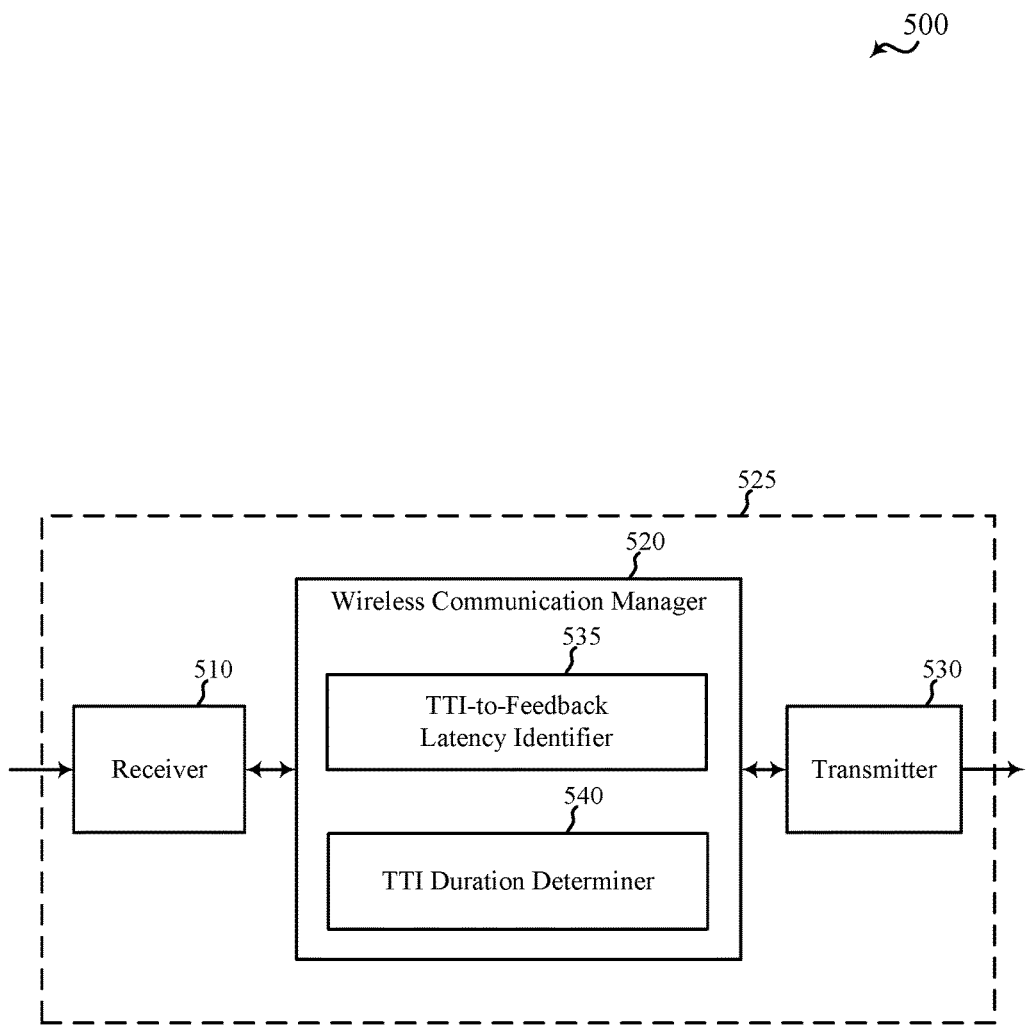
FIG. 5 shows a block diagram of an apparatus for use in wireless communication, in accordance with various aspects of the present disclosure.

FIG. 5 shows a block diagram 500 of an apparatus 525 for use in wireless communication, in accordance with various aspects of the present disclosure. The apparatus 525 may be an example of aspects of one or more of the base stations 105 or UEs 115 described with reference to FIG. 1. The apparatus 525 may be or include a processor. The apparatus 525 may include a receiver 510, a wireless communication manager 520, or a transmitter 530. Each of these components may be in communication with each other.

The components of the apparatus 525 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 510 may include at least one radio frequency (RF) receiver usable for LTE/LTE-A communications, as described, for example, with reference to FIG. 1, 2, 3, or 4. The receiver 510 may be used to receive various types of data or control signals (e.g., transmissions) over one or more communication links of a wireless communication system, such as one or more communication links of the wireless communication system 100 described with reference to FIG. 1.

In some examples, the transmitter 530 may include at least one RF transmitter usable for LTE/LTE-A communications. The transmitter 530 may be used to transmit various types of data or control signals (e.g., transmissions) over one or more communication links of a wireless communication system, such as one or more communication links of the wireless communication system 100 described with reference to FIG. 1.

In some examples, the wireless communication manager 520 may be used to manage one or more aspects of wireless communication for the apparatus 525. In some examples, part of the wireless communication manager 520 may be incorporated into or shared with the receiver 510 or the transmitter 530. In some examples, the wireless communication manager 520 may include a TTI-to-feedback latency identifier 535 or a TTI duration determiner 540.

The TTI-to-feedback latency identifier 535 may be used to identify a latency between a start of a TTI of a transmission burst and a feedback opportunity for the TTI. The TTI duration determiner 540 may be used to determine a duration of the TTI based at least in part on the latency. When the apparatus 525 is associated with or operated as a transmitter of the transmission burst, the determination made by the TTI duration determiner 540 may include a selection of an actual duration of the TTI. When the apparatus 525 is associated with or operated as a receiver of the transmission burst, the determination made by the TTI duration determiner 540 may include a determination of an expected duration of the TTI.

In some examples, the TTI may be a last TTI of the transmission burst. In some examples, the TTI may be other than the last TTI of the transmission burst. In some examples, the TTI-to-feedback latency identifier 535 may be used to identify a latency, and the TTI duration determiner 540 may be used to determine a duration, for each of a plurality of TTIs in a transmission burst (or for each TTI in the transmission burst).

Figure 6:
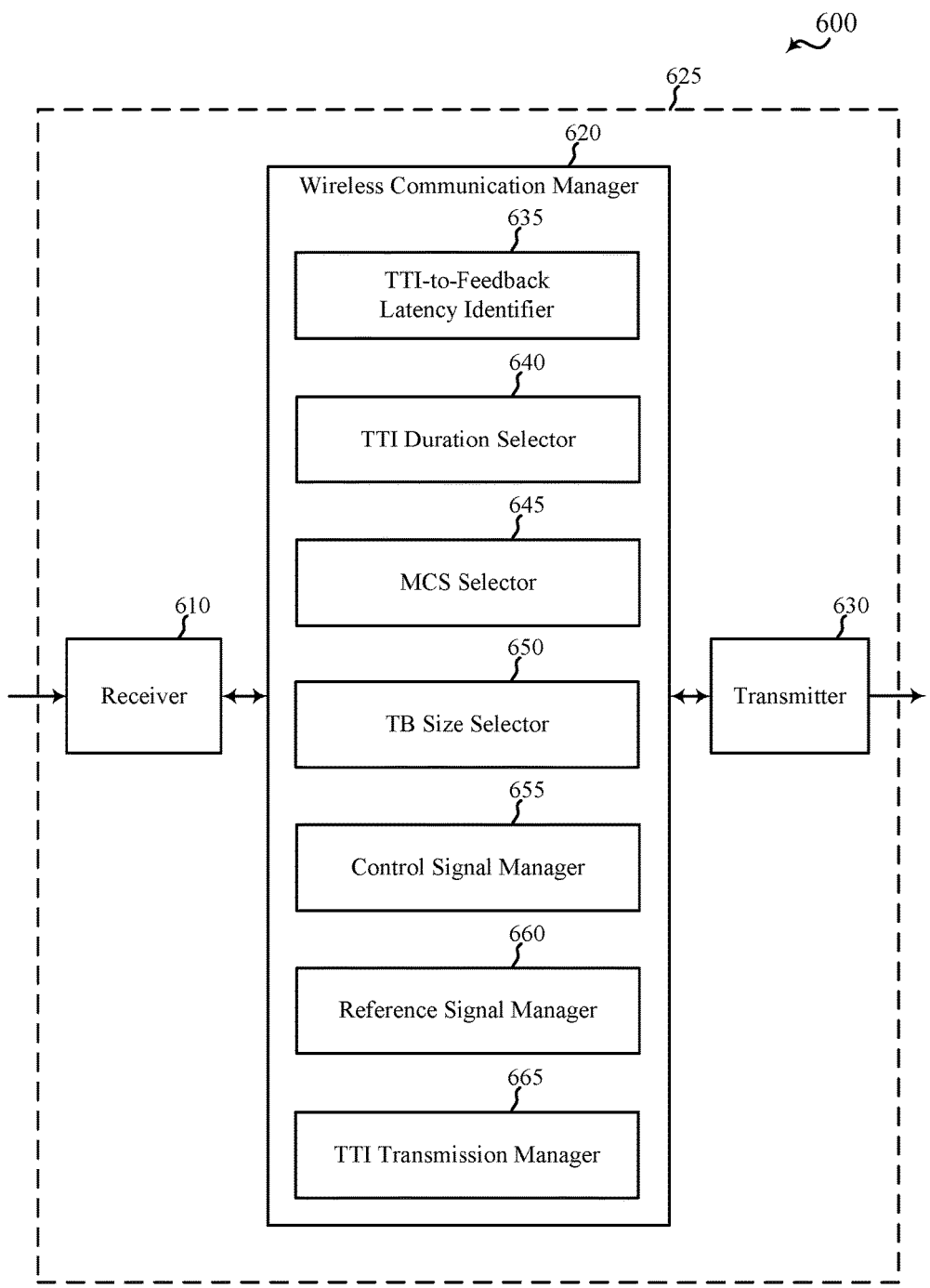
FIG. 6 shows a block diagram of an apparatus for use in wireless communication, in accordance with various aspects of the present disclosure.

FIG. 6 shows a block diagram 600 of an apparatus 625 for use in wireless communication, in accordance with various aspects of the present disclosure. The apparatus 625 may be an example of aspects of one or more of the base stations 105 or UEs 115 described with reference to FIG. 1, or aspects of the apparatus 525 described with reference to FIG. 5. The apparatus 625 may be or include a processor. The apparatus 625 may include a receiver 610, a wireless communication manager 620, or a transmitter 630. Each of these components may be in communication with each other.

The components of the apparatus 625 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one RF receiver usable for LTE/LTE-A communications, as described, for example, with reference to FIG. 1, 2, 3, or 4. The receiver 610 may be used to receive various types of data or control signals (e.g., transmissions) over one or more communication links of a wireless communication system, such as one or more communication links of the wireless communication system 100 described with reference to FIG. 1.

In some examples, the transmitter 630 may include at least one RF transmitter usable for LTE/LTE-A communications. The transmitter 630 may be used to transmit various types of data or control signals (e.g., transmissions) over one or more communication links of a wireless communication system, such as one or more communication links of the wireless communication system 100 described with reference to FIG. 1.

In some examples, the wireless communication manager 620 may be used to manage one or more aspects of wireless communication for the apparatus 625. In some examples, part of the wireless communication manager 620 may be incorporated into or shared with the receiver 610 or the transmitter 630. In some examples, the wireless communication manager 620 may include a TTI-to-feedback latency identifier 635, a TTI duration selector 640, an MCS selector 645, a TB size selector 650, a control signal manager 655, a reference signal manager 660, and/or a TTI transmission manager 665.

The TTI-to-feedback latency identifier 635 may be used to identify a latency between a start of a TTI of a transmission burst and a feedback opportunity for the TTI. The TTI duration selector 640 may be used to select a duration of the TTI based at least in part on the latency. In some examples, the duration may be selected based at least in part on comparing the latency to a threshold latency. When the latency satisfies the threshold latency (e.g., when the latency is greater than the threshold latency), the TTI duration may be selected without restriction. When the latency does not satisfy the threshold latency (e.g., when the latency is less than or equal to the threshold latency), the selection of the TTI duration may be restricted (e.g., the selection may be restricted to a subset of one or more durations that are less than a maximum TTI duration).

The MCS selector 645 may be used to select an MCS for the TTI, and the TB size selector 650 may be used to select a TB size for the TTI. When the TTI duration determiner 540 selects the duration of the TTI without a restriction, the MCS or TB size may be selected independently of the duration of the TTI. In some examples, the MCS selection or TB size selection may be based on channel feedback. When the TTI duration determiner 540 selects the duration of the TTI according to one or more restrictions, the MCS or TB size may be selected independently of the duration of the TTI. Alternatively, the MCS or TB size may be selected based at least in part on the duration of the TTI.

The control signal manager 655 may be used to transmit a control channel for the TTI, and the reference signal manager 660 may be used to transmit a reference signal for the TTI. When the TTI duration selector 640 selects the duration of the TTI without a restriction, in some examples, the control channel may be transmitted during the TTI.

When the TTI duration selector 640 selects the duration of the TTI according to one or more restrictions, in some examples, the control channel or reference signal may be transmitted at a beginning of the TTI, or during a preceding TTI of the transmission burst. The TTI transmission manager 665 may be used to transmit the TTI according to the selected duration, MCS, and/or TB size.

In some examples, the TTI may be a last TTI of the transmission burst. In some examples, the TTI may be other than the last TTI of the transmission burst. In some examples, the TTI-to-feedback latency identifier 635 may be used to identify a latency, the TTI duration selector 640 may be used to determine a duration, the MCS selector 645 may be used to select an MCS, the TB size selector 650 may be used to select a TB size, the control signal manager 655 may be used to transmit a control signal, the reference signal manager 660 may be used to transmit a reference signal, and/or the TTI transmission manager 665 may be used to transmit a TTI for each of a plurality of TTIs in a transmission burst (or for each TTI in the transmission burst).

Figure 7:
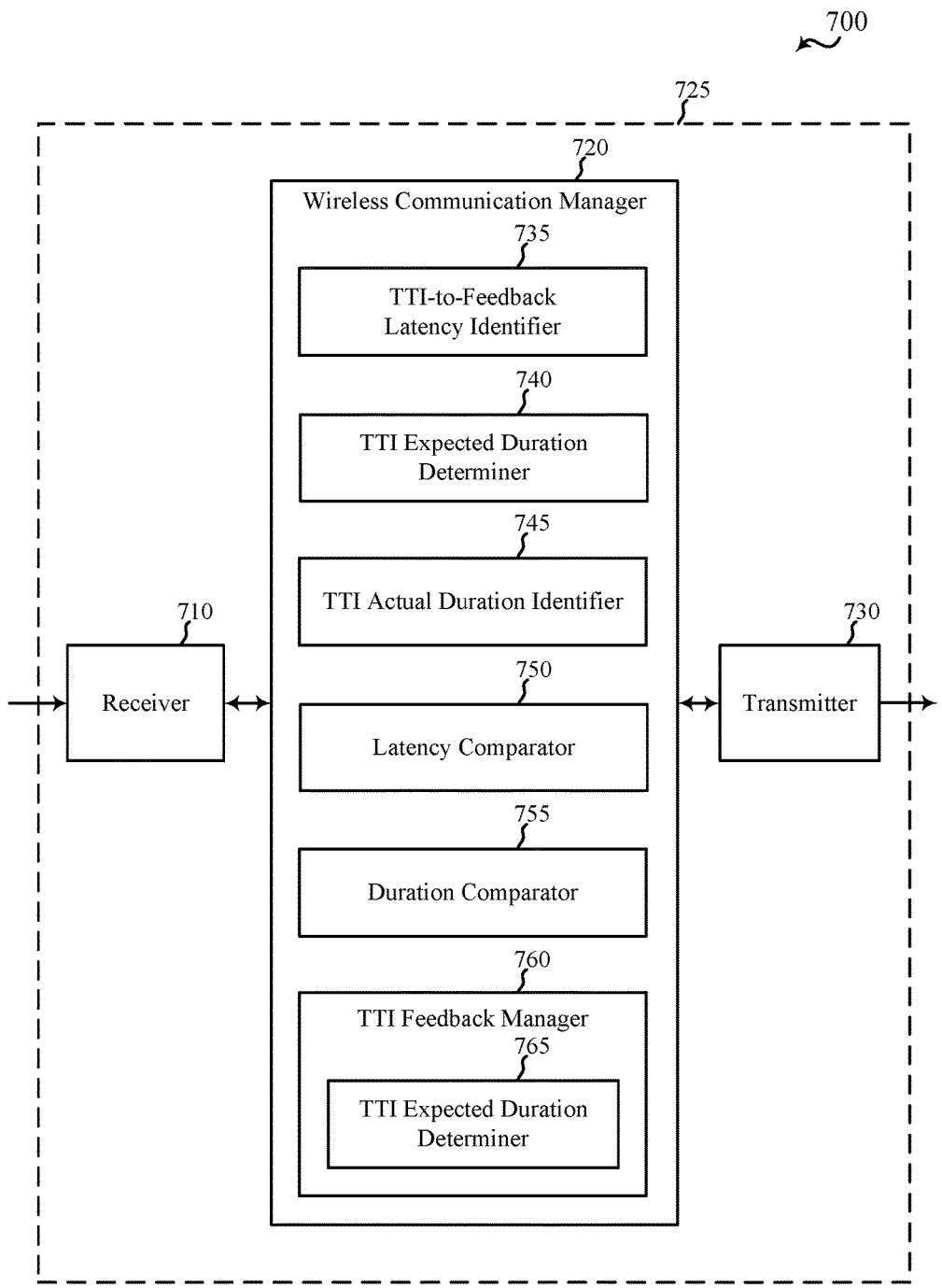
FIG. 7 shows a block diagram of an apparatus for use in wireless communication, in accordance with various aspects of the present disclosure.

FIG. 7 shows a block diagram 700 of an apparatus 725 for use in wireless communication, in accordance with various aspects of the present disclosure. The apparatus 725 may be an example of aspects of one or more of the base stations 105 or UEs 115 described with reference to FIG. 1, or aspects of the apparatus 525 described with reference to FIG. 5. The apparatus 725 may be or include a processor. The apparatus 725 may include a receiver 710, a wireless communication manager 720, or a transmitter 730. Each of these components may be in communication with each other.

The components of the apparatus 725 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one RF receiver usable for LTE/LTE-A communications, as described, for example, with reference to FIG. 1, 2, 3, or 4. The receiver 710 may be used to receive various types of data or control signals (e.g., transmissions) over one or more communication links of a wireless communication system, such as one or more communication links of the wireless communication system 100 described with reference to FIG. 1.

In some examples, the transmitter 730 may include at least one RF transmitter usable for LTE/LTE-A communications. The transmitter 730 may be used to transmit various types of data or control signals (e.g., transmissions) over one or more communication links of a wireless communication system, such as one or more communication links of the wireless communication system 100 described with reference to FIG. 1.

In some examples, the wireless communication manager 720 may be used to manage one or more aspects of wireless communication for the apparatus 725. In some examples, part of the wireless communication manager 720 may be incorporated into or shared with the receiver 710 or the transmitter 730. In some examples, the wireless communication manager 720 may include a TTI-to-feedback latency identifier 735, a TTI expected duration determiner 740, a TTI actual duration identifier 745, a latency comparator 750, a duration comparator 755, or a TTI feedback manager 760. The TTI feedback manager 760 may include a TTI feedback modifier 765.

The TTI-to-feedback latency identifier 735 may be used to identify a latency between a start of a TTI of a transmission burst and a feedback opportunity for the TTI. The TTI expected duration determiner 740 may be used to determine an expected duration of the TTI based at least in part on the latency. The TTI actual duration identifier 745 may be used to identify an actual duration of the TTI. The latency comparator 750 may be used to determine whether a latency identified by the TTI-to-feedback latency identifier 735 satisfies a threshold latency (e.g., whether the latency is greater than the threshold latency). The duration comparator 755 may be used to determine whether the actual duration of the TTI is greater than the expected duration of the TTI.

The TTI feedback manager 760 may be used to transmit feedback for the TTI when the latency comparator 750 determines the latency satisfies a threshold latency (e.g., when the latency is determined to be greater than the threshold latency). The TTI feedback manager 760 may additionally or alternatively be used to transmit feedback for the TTI when the latency comparator 750 determines the latency does not satisfy the threshold latency (e.g., when the latency is determined to be less than or equal to the threshold latency) and the duration comparator 755 determines the actual duration of the TTI is less than or equal to the expected duration of the TTI.

The TTI feedback modifier 765 may be used to modify feedback for the TTI when the latency comparator 750 determines the latency does not satisfy the threshold latency (e.g., when the latency is determined to be less than or equal to the threshold latency) and the duration comparator 755 determines the actual duration of the TTI is greater than the expected duration of the TTI. In some examples, modifying the feedback may include transmitting partial feedback for the TTI during the feedback opportunity. In some examples, modifying the feedback may include refraining from transmitting feedback for the TTI during the feedback opportunity.

In some examples, the TTI may be a last TTI of the transmission burst. In some examples, the TTI may be other than the last TTI of the transmission burst. In some examples, the TTI-to-feedback latency identifier 735 may be used to identify a latency, the TTI expected duration determiner 740 may be used to determine an expected duration, the TTI actual duration identifier 745 may be used to determine an actual duration, the latency comparator 750 and the duration comparator 755 may be used to make comparisons, and the TTI feedback manager 760 and/or TTI feedback modifier 765 may be used to transmit or refrain from transmitting feedback for each of a plurality of TTIs in a transmission burst (or for each TTI in the transmission burst).

In examples in which the apparatus 725 is associated with a UE, the wireless communication manager 720 may be used to monitor at least one of a control channel or scheduling information received from a base station. In these examples, the actual duration of the TTI may be identified by the TTI actual duration identifier 745, based at least in part on the monitoring.

Figure 8:
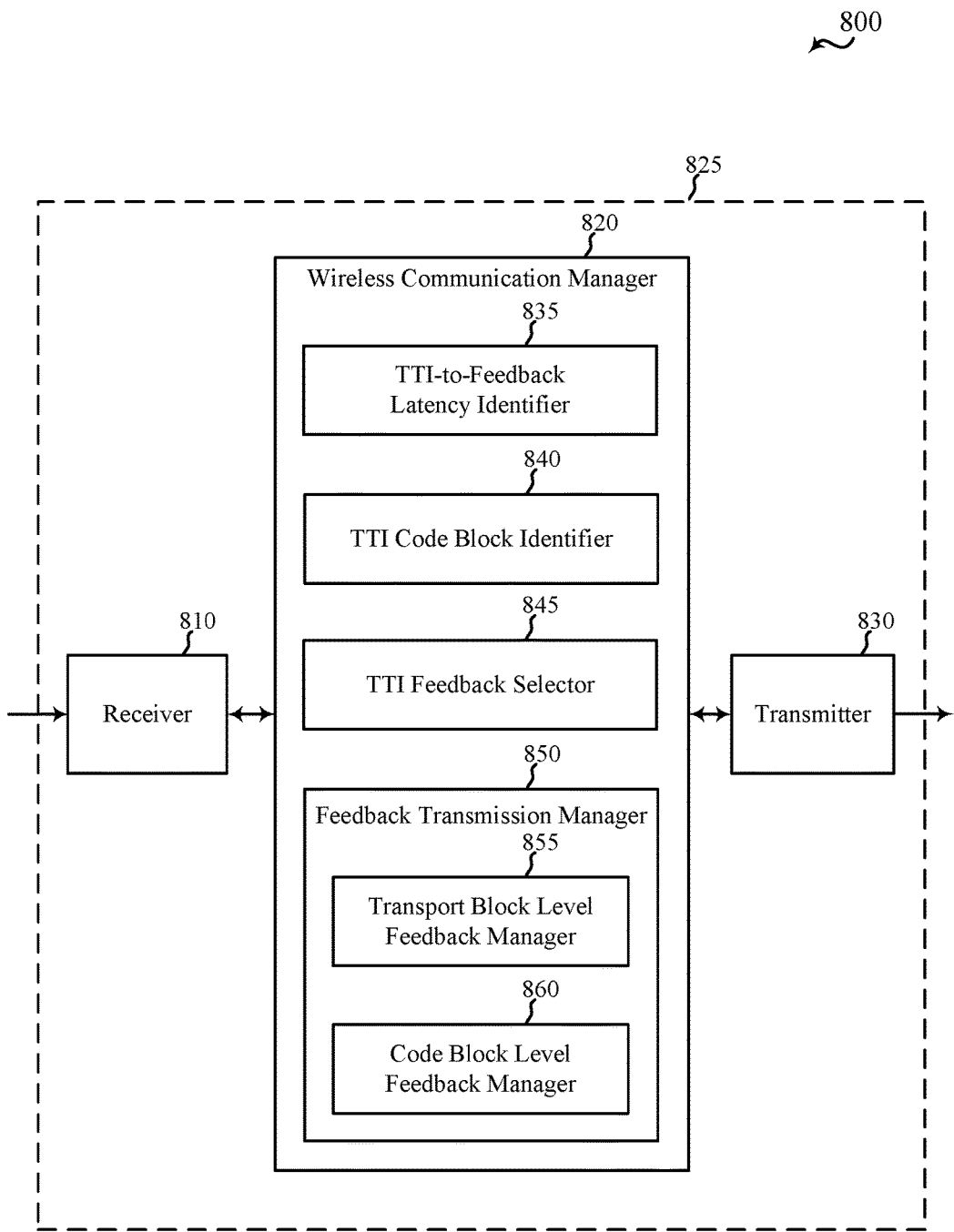
FIG. 8 shows a block diagram of an apparatus for use in wireless communication, in accordance with various aspects of the present disclosure.

FIG. 8 shows a block diagram 800 of an apparatus 825 for use in wireless communication, in accordance with various aspects of the present disclosure. The apparatus 825 may be an example of aspects of one or more of the base stations 105 or UEs 115 described with reference to FIG. 1. The apparatus 825 may be or include a processor. The apparatus 825 may include a receiver 810, a wireless communication manager 820, or a transmitter 830. Each of these components may be in communication with each other.

The components of the apparatus 825 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver usable for LTE/LTE-A communications, as described, for example, with reference to FIG. 1, 2, 3, or 4. The receiver 810 may be used to receive various types of data or control signals (e.g., transmissions) over one or more communication links of a wireless communication system, such as one or more communication links of the wireless communication system 100 described with reference to FIG. 1.

In some examples, the transmitter 830 may include at least one RF transmitter usable for LTE/LTE-A communications. The transmitter 830 may be used to transmit various types of data or control signals (e.g., transmissions) over one or more communication links of a wireless communication system, such as one or more communication links of the wireless communication system 100 described with reference to FIG. 1.

In some examples, the wireless communication manager 820 may be used to manage one or more aspects of wireless communication for the apparatus 825. In some examples, part of the wireless communication manager 820 may be incorporated into or shared with the receiver 810 or the transmitter 830. In some examples, the wireless communication manager 820 may include a TTI-to-feedback latency identifier 835, a TTI code block identifier 840, a TTI feedback selector 845, or a feedback transmission manager 850. The feedback transmission manager 850 may include a transport block level feedback manager 855 or a code block level feedback manager 860.

The TTI-to-feedback latency identifier 835 may be used to identify a latency between an end of a TTI of a transmission burst and a feedback opportunity for the TTI. The TTI code block identifier 840 may be used to identify a plurality of code blocks in the TTI. The TTI feedback selector 845 may be used to select one of a transport block level feedback or a code block level feedback for the TTI based at least in part on the latency. In some examples, the transport block level feedback or the code block level feedback may be selected based at least in part on comparing the latency to a threshold latency. When the latency satisfies the threshold latency (e.g., when the latency is greater than the threshold latency), the transport block level feedback may be selected. When the latency does not satisfy the threshold latency (e.g., when the latency is less than or equal to the threshold latency), the code block level feedback may be selected.

The feedback transmission manager 850 may be used to transmit the selected transport block level feedback or code block level feedback for the TTI during the feedback opportunity. The transport block level feedback manager 855 may be used to transmit the transport block level feedback for the TTI when the TTI feedback selector 845 selects the transport block level feedback. The code block level feedback manager 860 may be used to transmit the code block level feedback for the TTI when the TTI feedback selector 845 selects the code block level feedback for the TTI. In some examples, transmitting code block level feedback may include transmitting a default acknowledgement or a default non-acknowledgement of at least one code block that is not processed in time to report feedback during the feedback opportunity. In some examples, transmitting code block level feedback may include transmitting an acknowledgement or a non-acknowledgement for a first set of one or more code blocks that is not processed in time to report feedback during the feedback opportunity. The acknowledgement or non-acknowledgement may be based at least in part on an acknowledgement or non-acknowledgement of at least one code block that is processed in time to report feedback during the feedback opportunity.

In some examples, the TTI may be a last TTI of the transmission burst. In some examples, the TTI may be other than the last TTI of the transmission burst. In some examples, the TTI-to-feedback latency identifier 835 may be used to identify a latency, the TTI code block identifier 840 may be used to identify code blocks, the TTI feedback selector 845 may be used to select a transport block level feedback or a code block level feedback, and the feedback transmission manager 850 may be used to transmit the transport block level feedback or the code block level feedback for each of a plurality of TTIs in a transmission burst (or for each TTI in the transmission burst).

Figure 9:
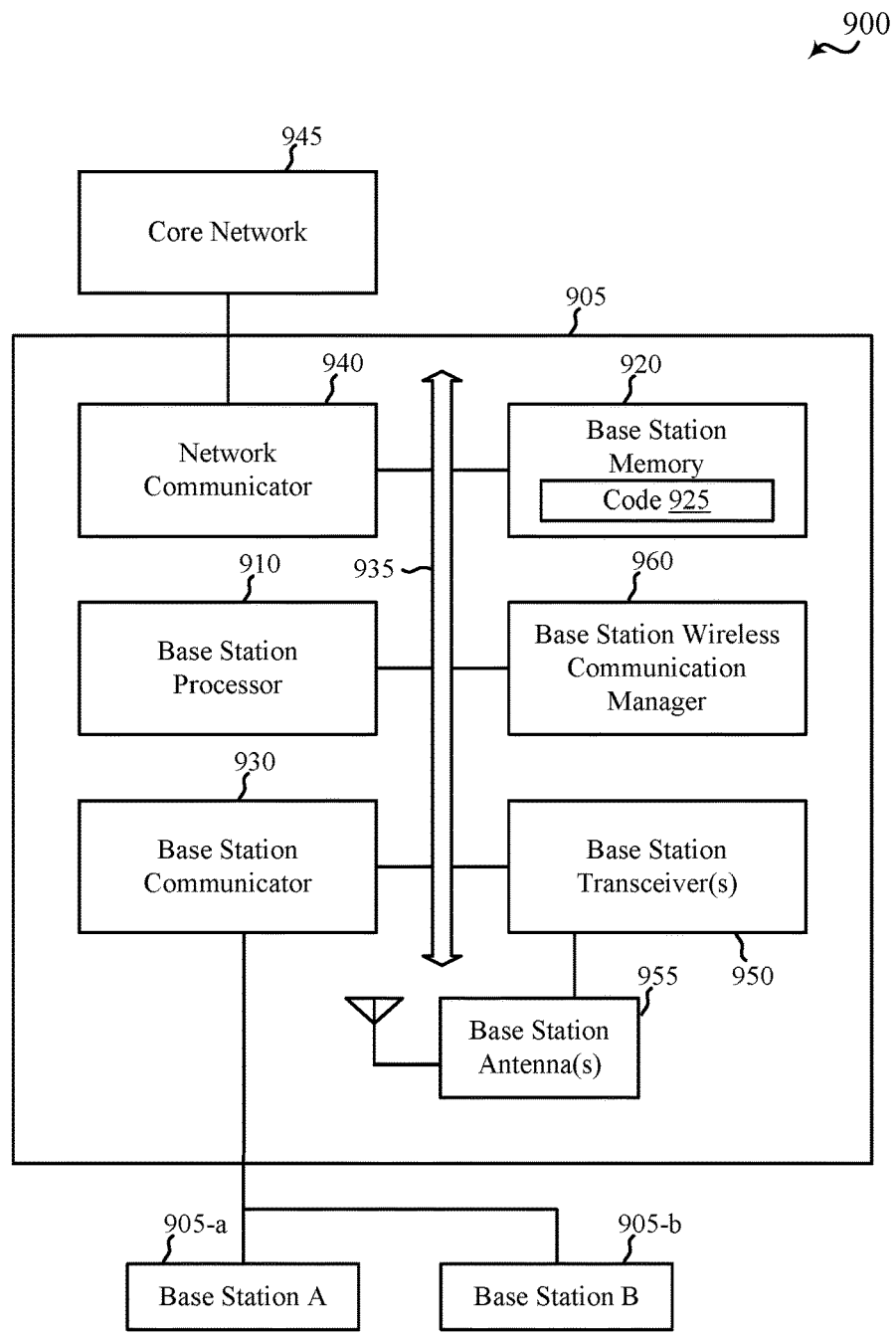
FIG. 9 shows a block diagram of a base station (e.g., a base station forming part or all of an eNB) for use in wireless communication, in accordance with various aspects of the present disclosure.

FIG. 9 shows a block diagram 900 of a base station 905 (e.g., a base station forming part or all of an eNB) for use in wireless communication, in accordance with various aspects of the present disclosure. In some examples, the base station 905 may be an example of aspects of one or more of the base stations 105 described with reference to FIG. 1, or aspects of one or more of the apparatuses 525, 625, 725, or 825 described with reference to FIG. 5, 6, 7, or 8. The base station 905 may be configured to implement or facilitate at least some of the wireless communication techniques and functions described with reference to FIG. 1, 2, 3, 4, 5, 6, 7, or 8.

The base station 905 may include a base station processor 910, a base station memory 920, at least one base station transceiver (represented by base station transceiver(s) 950), at least one base station antenna (represented by base station antenna(s) 955), and/or a base station wireless communication manager 960. The base station 905 may also include one or more of a base station communicator 930 and/or a network communicator 940. Each of these components may be in communication with each other, directly or indirectly, over one or more buses 935.

The base station memory 920 may include random access memory (RAM) or read-only memory (ROM). The base station memory 920 may store computer-readable, computer-executable code 925 including instructions that are configured to, when executed, cause the base station processor 910 to perform various functions described herein related to wireless communication, including, for example, determining a duration of a TTI or transmitting or receiving feedback for the TTI based at least in part on a latency between the TTI and a feedback opportunity for the TTI. Alternatively, the computer-executable code 925 may not be directly executable by the base station processor 910 but be configured to cause the base station 905 (e.g., when compiled and executed) to perform various of the functions described herein.

The base station processor 910 may include an intelligent hardware device, e.g., a central processing unit (CPU), a microcontroller, an ASIC, etc. The base station processor 910 may process information received through the base station transceiver(s) 950, the base station communicator 930, or the network communicator 940. The base station processor 910 may process information to be sent to the transceiver(s) 950 for transmission through the antenna(s) 955, to the base station communicator 930, for transmission to one or more other base stations (e.g., base station 905-a and base station 905-b), or to the network communicator 940 for transmission to a core network 945, which may be an example of one or more aspects of the core network 130 described with reference to FIG. 1. The base station processor 910 may handle, alone or in connection with the base station wireless communication manager 960, various aspects of communicating over (or managing communications over) one or more radio frequency spectrum bands.

The base station transceiver(s) 950 may include a modem configured to modulate packets and provide the modulated packets to the base station antenna(s) 955 for transmission, and to demodulate packets received from the base station antenna(s) 955. The base station transceiver(s) 950 may, in some examples, be implemented as one or more base station transmitters and one or more separate base station receivers. The base station transceiver(s) 950 may be configured to communicate bi-directionally, via the antenna(s) 955, with one or more UEs or apparatuses, such as one or more of the UEs 115 described with reference to FIG. 1, or one or more of the apparatuses 525, 625, 725, or 825 described with reference to FIG. 5, 6, 7, or 8. The base station 905 may, for example, include multiple base station antennas 955 (e.g., an antenna array). The base station 905 may communicate with the core network 945 through the network communicator 940. The base station 905 may also communicate with other base stations, such as the base station 905-a and the base station 905-b, using the base station communicator 930.

The base station wireless communication manager 960 may be configured to perform or control some or all of the techniques or functions described with reference to FIG. 1, 2, 3, 4, 5, 6, 7, or 8 related to wireless communication by a base station. The base station wireless communication manager 960, or portions of it, may include a processor, or some or all of the functions of the base station wireless communication manager 960 may be performed by the base station processor 910 or in connection with the base station processor 910. In some examples, the base station wireless communication manager 960 may be an example of the wireless communication manager 520, 620, 720, or 820 described with reference to FIG. 5, 6, 7, or 8.

Figure 10:
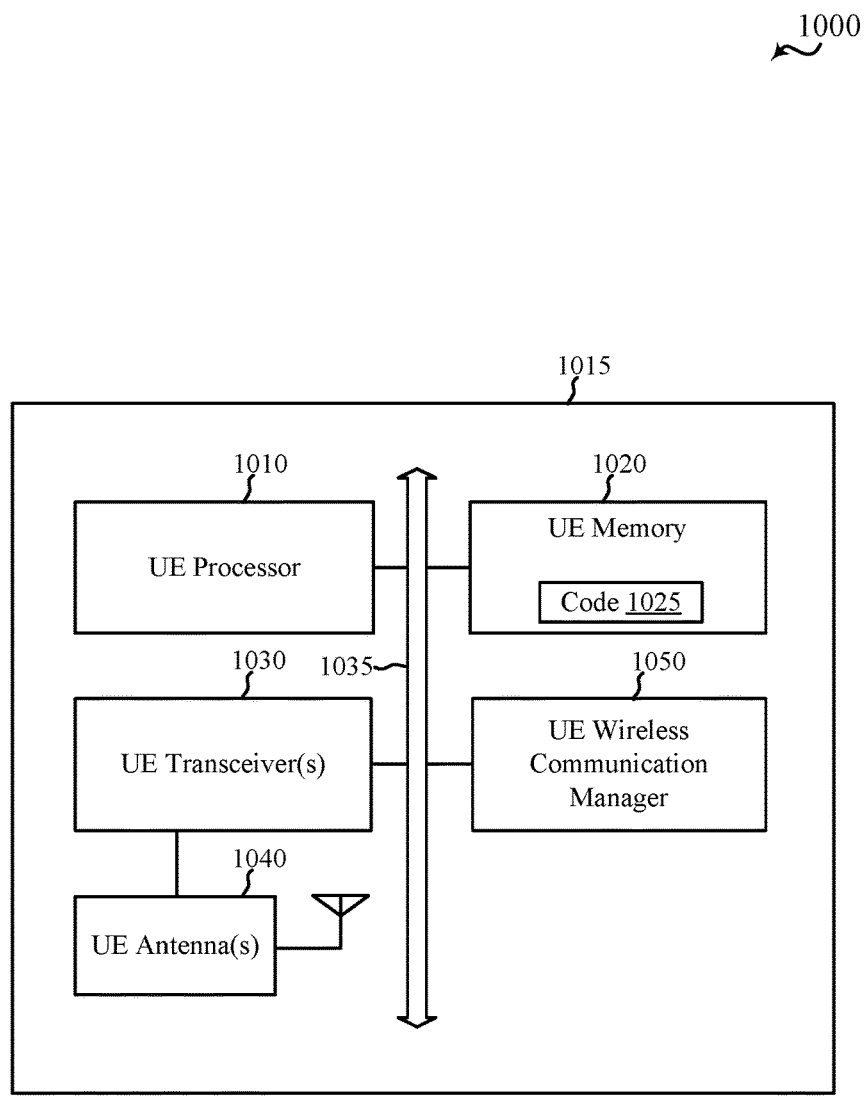
FIG. 10 shows a block diagram of a UE for use in wireless communication, in accordance with various aspects of the present disclosure.

FIG. 10 shows a block diagram 1000 of a UE 1015 for use in wireless communication, in accordance with various aspects of the present disclosure. The UE 1015 may be included or be part of a personal computer (e.g., a laptop computer, a netbook computer, a tablet computer, etc.), a cellular telephone, a PDA, a DVR, an internet appliance, a gaming console, an e-reader, etc. The UE 1015 may, in some examples, have an internal power supply (not shown), such as a small battery, to facilitate mobile operation. In some examples, the UE 1015 may be an example of aspects of one or more of the UEs 115 described with reference to FIG. 1, or aspects of one or more of the apparatuses 525, 625, 725, or 825 described with reference to FIG. 5, 6, 7, or 8. The UE 1015 may be configured to implement at least some of the UE or apparatus techniques and functions described with reference to FIG. 1, 2, 3, 4, 5, 6, 7, or 8.

The UE 1015 may include a UE processor 1010, a UE memory 1020, at least one UE transceiver (represented by UE transceiver(s) 1030), at least one UE antenna (represented by UE antenna(s) 1040), and/or a UE wireless communication manager 1050. Each of these components may be in communication with each other, directly or indirectly, over one or more buses 1035.

The UE memory 1020 may include RAM or ROM. The UE memory 1020 may store computer-readable, computer-executable code 1025 including instructions that are configured to, when executed, cause the UE processor 1010 to perform various functions described herein related to wireless communication, including, for example, determining a duration of a TTI or transmitting or receiving feedback for the TTI based at least in part on a latency between the TTI and a feedback opportunity for the TTI. Alternatively, the computer-executable code 1025 may not be directly executable by the UE processor 1010 but be configured to cause the UE 1015 (e.g., when compiled and executed) to perform various of the functions described herein.

The UE processor 1010 may include an intelligent hardware device, e.g., a CPU, a microcontroller, an ASIC, etc. The UE processor 1010 may process information received through the UE transceiver(s) 1030 or information to be sent to the UE transceiver(s) 1030 for transmission through the UE antenna(s) 1040. The UE processor 1010 may handle, alone or in connection with the UE wireless communication manager 1050, various aspects of communicating over (or managing communications over) one or more radio frequency spectrum bands.

The UE transceiver(s) 1030 may include a modem configured to modulate packets and provide the modulated packets to the UE antenna(s) 1040 for transmission, and to demodulate packets received from the UE antenna(s) 1040. The UE transceiver(s) 1030 may, in some examples, be implemented as one or more UE transmitters and one or more separate UE receivers. The UE transceiver(s) 1030 may be configured to communicate bi-directionally, via the UE antenna(s) 1040, with one or more base stations or apparatuses, such as one or more of the base stations 105 or 905 described with reference to FIG. 1 or 9, or one or more of the apparatuses 525, 625, 725, or 825 described with reference to FIG. 5, 6, 7, or 8. While the UE 1015 may include a single UE antenna, there may be examples in which the UE 1015 may include multiple UE antennas 1040.

The UE wireless communication manager 1050 may be configured to perform or control some or all of the UE or apparatus techniques or functions described with reference to FIG. 1, 2, 3, 4, 5, 6, 7, or 8 related to wireless communication by a UE. The UE wireless communication manager 1050, or portions of it, may include a processor, or some or all of the functions of the UE wireless communication manager 1050 may be performed by the UE processor 1010 or in connection with the UE processor 1010. In some examples, the UE wireless communication manager 1050 may be an example of the wireless communication manager 520, 620, 720, or 820 described with reference to FIG. 5, 6, 7, or 8.

Figure 11:
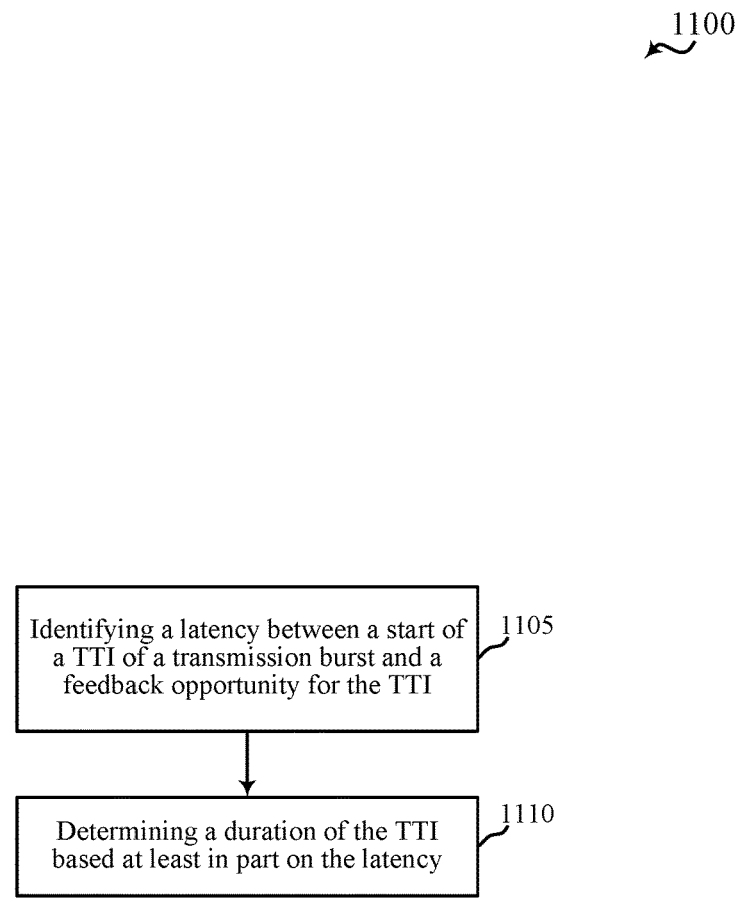
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to a wireless communication device including aspects of one or more of the base stations 105 or 905 described with reference to FIG. 1 or 9, aspects of one or more of the UEs 115 or 1015 described with reference to FIG. 1 or 10, or aspects of one or more of the apparatuses 525, 625, or 725 described with reference to FIG. 5, 6, or 7. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1105, the method 1100 may include identifying a latency between a start of a TTI of a transmission burst and a feedback opportunity for the TTI. The operation(s) at block 1105 may be performed using the wireless communication manager 520, 620, or 720, the base station wireless communication manager 960, or the UE wireless communication manager 1050 described with reference to FIG. 5, 6, 7, 9, or 10, or the TTI-to-feedback latency identifier 535, 635, or 735 described with reference to FIG. 5, 6, or 7.

At block 1110, the method 1100 may include determining a duration of the TTI based at least in part on the latency. When the method 1100 is performed by a transmitter of the transmission burst, the determining may include selecting the duration (e.g., an actual duration) of the TTI based at least in part on the latency identified at block 1105. When the method 1100 is performed by a receiver of the transmission burst, the determined duration may be an expected duration of the TTI. The operation(s) at block 1110 may be performed using the wireless communication manager 520, 620, or 720, the base station wireless communication manager 960, or the UE wireless communication manager 1050 described with reference to FIG. 5, 6, 7, 9, or 10, or the TTI duration determiner 540, the TTI duration selector 640, or the TTI expected duration determiner 740 described with reference to FIG. 5, 6, or 7.

In some examples, the TTI may be a last TTI of the transmission burst. In some examples, the TTI may be other than the last TTI of the transmission burst. In some examples, the identifying and determining operations of the method 1100 may be repeated for each of a plurality of TTIs in the transmission burst (or for each TTI in the transmission burst).

Thus, the method 1100 may provide for wireless communication. It should be noted that the method 1100 is just one implementation and that the operations of the method 1100 may be rearranged or otherwise modified such that other implementations are possible.

Figure 12:
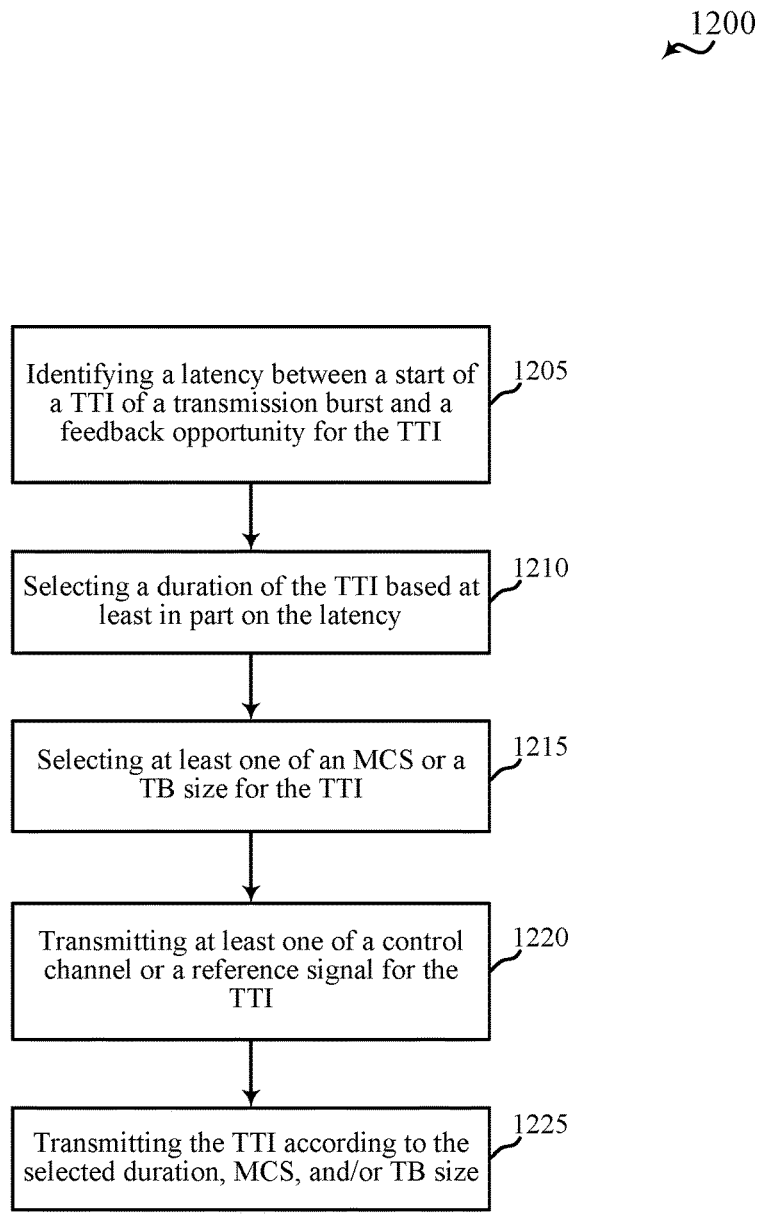
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to a wireless communication device including aspects of one or more of the base stations 105 or 905 described with reference to FIG. 1 or 9, aspects of one or more of the UEs 115 or 1015 described with reference to FIG. 1 or 10, or aspects of one or more of the apparatuses 525 or 625 described with reference to FIG. 5 or 6. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1205, the method 1200 may include identifying a latency between a start of a TTI of a transmission burst and a feedback opportunity for the TTI. The operation(s) at block 1205 may be performed using the wireless communication manager 520 or 620, the base station wireless communication manager 960, or the UE wireless communication manager 1050 described with reference to FIG. 5, 6, 9, or 10, or the TTI-to-feedback latency identifier 535 or 635 described with reference to FIG. 5 or 6.

At block 1210, the method 1200 may include selecting a duration of the TTI based at least in part on the latency. In some examples, the duration may be selected based at least in part on comparing the latency to a threshold latency. When the latency satisfies the threshold latency (e.g., when the latency is greater than the threshold latency), the duration may be selected without restriction. When the latency does not satisfy the threshold latency (e.g., when the latency is less than or equal to the threshold latency), the method 1200 may include restricting the selecting (e.g., restricting the selecting to a subset of one or more durations that are less than a maximum TTI duration). The operation(s) at block 1210 may be performed using the wireless communication manager 520 or 620, the base station wireless communication manager 960, or the UE wireless communication manager 1050 described with reference to FIG. 5, 6, 9, or 10, or the TTI duration determiner 540 or the TTI duration selector 640 described with reference to FIG. 5 or 6.

At block 1215, the method 1200 may include selecting at least one of an MCS or a TB size for the TTI. When the duration of the TTI is selected without restriction at block 1210, the MCS or TB size may selected independently of the duration of the TTI. In some examples, the MCS or TB size selected at block 1215 may be based on channel feedback. When the duration of the TTI is selected according to one or more restrictions at block 1210, the MCS or TB size may be selected independently of the duration of the TTI. Alternatively, the MCS or TB size may be selected based at least in part on the duration of the TTI. Alternatively, when the duration of the TTI is selected according to one or more restrictions at block 1210, the operation(s) at block 1215 may include capping the MCS or the TB size for the TTI, based at least in part on the latency identified at block 1205. The operation(s) at block 1215 may be performed using the wireless communication manager 520 or 620, the base station wireless communication manager 960, or the UE wireless communication manager 1050 described with reference to FIG. 5, 6, 9, or 10, or the MCS selector 645 or the TB size selector 650 described with reference to FIG. 6.

At block 1220, the method 1200 may include transmitting at least one of a control channel or a reference signal for the TTI. When the duration of the TTI is selected without restriction at block 1210, the control channel may be transmitted during the TTI. When the duration of the TTI is selected according to one or more restrictions at block 1210, the control channel or reference signal may be transmitted at a beginning of the TTI, or during a preceding TTI of the transmission burst. The operation(s) at block 1220 may be performed using the wireless communication manager 520 or 620, the base station wireless communication manager 960, or the UE wireless communication manager 1050 described with reference to FIG. 5, 6, 9, or 10, or the control signal manager 655 or the reference signal manager 660 described with reference to FIG. 6.

At block 1225, the method 1200 may include transmitting the TTI according to the selected duration, MCS, and/or TB size. The operation(s) at block 1225 may be performed using the wireless communication manager 520 or 620, the base station wireless communication manager 960, or the UE wireless communication manager 1050 described with reference to FIG. 5, 6, 9, or 10, or the TTI transmission manager 665 described with reference to FIG. 6.

In some examples, the TTI may be a last TTI of the transmission burst. In some examples, the TTI may be other than the last TTI of the transmission burst. In some examples, the identifying, selecting, and transmitting operations of the method 1200 may be repeated for each of a plurality of TTIs in the transmission burst (or for each TTI in the transmission burst).

Thus, the method 1200 may provide for wireless communication. It should be noted that the method 1200 is just one implementation and that the operations of the method 1200 may be rearranged or otherwise modified such that other implementations are possible.

Figure 13:
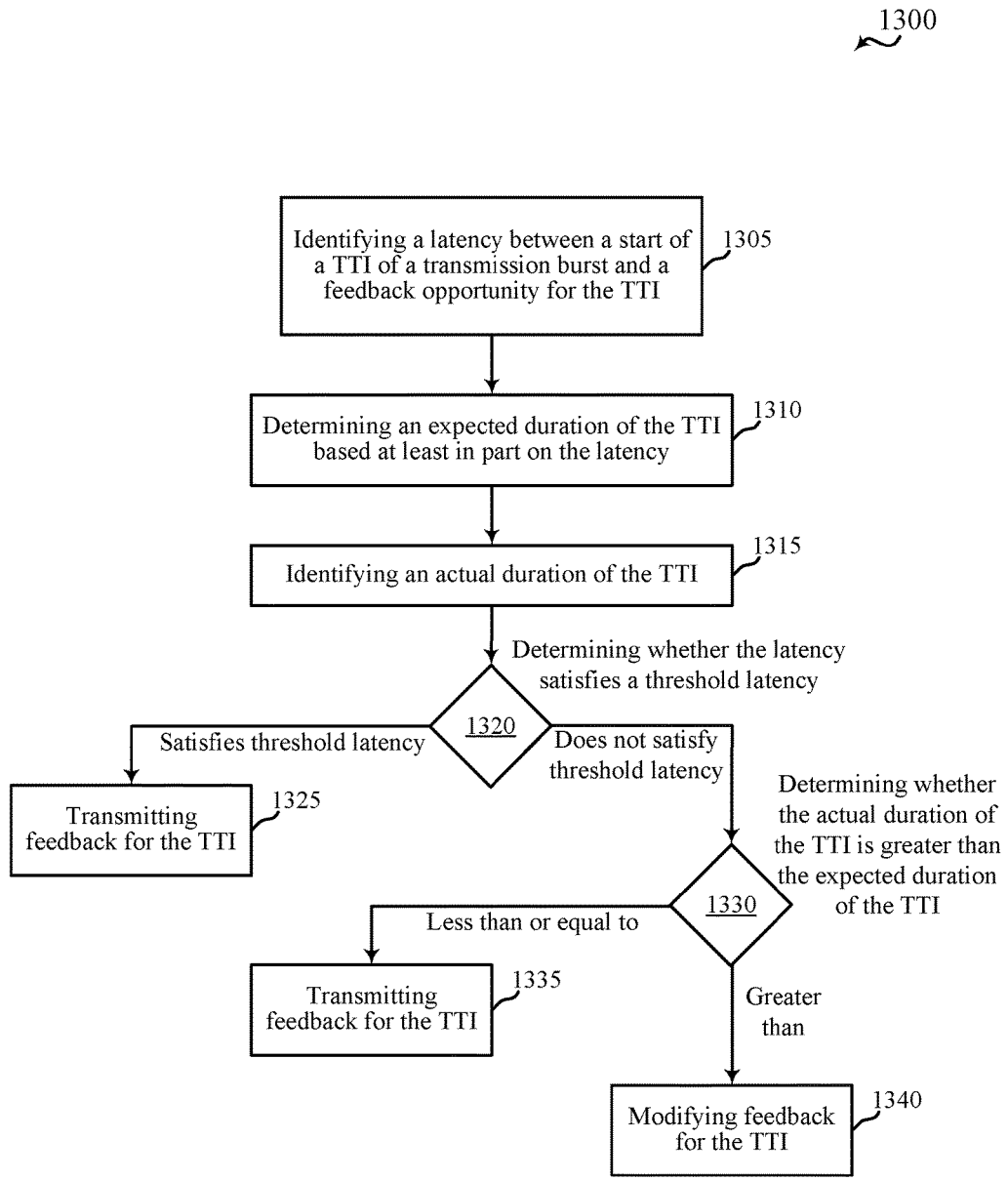
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to a wireless communication device including aspects of one or more of the base stations 105 or 905 described with reference to FIG. 1 or 9, aspects of one or more of the UEs 115 or 1015 described with reference to FIG. 1 or 10, or aspects of one or more of the apparatuses 525 or 725 described with reference to FIG. 5 or 7. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1305, the method 1300 may include identifying a latency between a start of a TTI of a transmission burst and a feedback opportunity for the TTI. The operation(s) at block 1305 may be performed using the wireless communication manager 520 or 720, the base station wireless communication manager 960, or the UE wireless communication manager 1050 described with reference to FIG. 5, 7, 9, or 10, or the TTI-to-feedback latency identifier 535 or 735 described with reference to FIG. 5 or 7.

At block 1310, the method 1300 may include determining an expected duration of the TTI based at least in part on the latency. The operation(s) at block 1310 may be performed using the wireless communication manager 520 or 720, the base station wireless communication manager 960, or the UE wireless communication manager 1050 described with reference to FIG. 5, 7, 9, or 10, or the TTI duration determiner 540 or TTI expected duration determiner 740 described with reference to FIG. 5 or 7.

At block 1315, the method 1300 may include identifying an actual duration of the TTI. The operation(s) at block 1315 may be performed using the wireless communication manager 520 or 720, the base station wireless communication manager 960, or the UE wireless communication manager 1050 described with reference to FIG. 5, 7, 9, or 10, or the TTI actual duration identifier 745 described with reference to FIG. 7.

At block 1320, the method 1300 may include determining whether the latency satisfies a threshold latency. When the latency satisfies the threshold latency (e.g., when the latency is greater than the threshold latency), the method 1300 may continue at block 1325. When the latency does not satisfy the threshold latency (e.g., when the latency is less than or equal to the threshold latency), the method 1300 may continue at block 1330. The operation(s) at block 1320 may be performed using the wireless communication manager 520 or 720, the base station wireless communication manager 960, or the UE wireless communication manager 1050 described with reference to FIG. 5, 7, 9, or 10, or the latency comparator 750 described with reference to FIG. 7.

At block 1325, the method 1300 may include transmitting feedback for the TTI. The operation(s) at block 1325 may be performed using the wireless communication manager 520 or 720, the base station wireless communication manager 960, or the UE wireless communication manager 1050 described with reference to FIG. 5, 7, 9, or 10, or the TTI feedback manager 760 described with reference to FIG. 7.

At block 1330, the method 1300 may include determining whether the actual duration of the TTI is greater than the expected duration of the TTI. When the actual duration of the TTI is less than or equal to the expected duration of the TTI, the method may continue at block 1335. When the actual duration of the TTI is greater than the expected duration of the TTI, the method may continue at block 1340. The operation(s) at block 1330 may be performed using the wireless communication manager 520 or 720, the base station wireless communication manager 960, or the UE wireless communication manager 1050 described with reference to FIG. 5, 7, 9, or 10, or the duration comparator 755 described with reference to FIG. 7.

At block 1335, the method 1300 may include transmitting feedback for the TTI. At block 1340, the method may include modifying feedback for the TTI. In some examples, modifying the feedback may include transmitting partial feedback for the TTI during the feedback opportunity. In some examples, modifying the feedback may include refraining from transmitting feedback for the TTI during the feedback opportunity. The operation(s) at block 1335 or 1340 may be performed using the wireless communication manager 520 or 720, the base station wireless communication manager 960, or the UE wireless communication manager 1050 described with reference to FIG. 5, 7, 9, or 10, or the TTI feedback manager 760 or TTI feedback modifier 765 described with reference to FIG. 7.

In some examples, the TTI may be a last TTI of the transmission burst. In some examples, the TTI may be other than the last TTI of the transmission burst. In some examples, the identifying, determining, modifying, and/or transmitting operations of the method 1300 may be repeated for each of a plurality of TTIs in the transmission burst (or for each TTI in the transmission burst).

In examples in which the method 1300 is performed by a UE, the method 1300 may include monitoring at least one of a control channel or scheduling information received from a base station. In these examples, the actual duration of the TTI may be identified, at block 1310, based at least in part on the monitoring.

Thus, the method 1300 may provide for wireless communication. It should be noted that the method 1300 is just one implementation and that the operations of the method 1300 may be rearranged or otherwise modified such that other implementations are possible.

Figure 14:
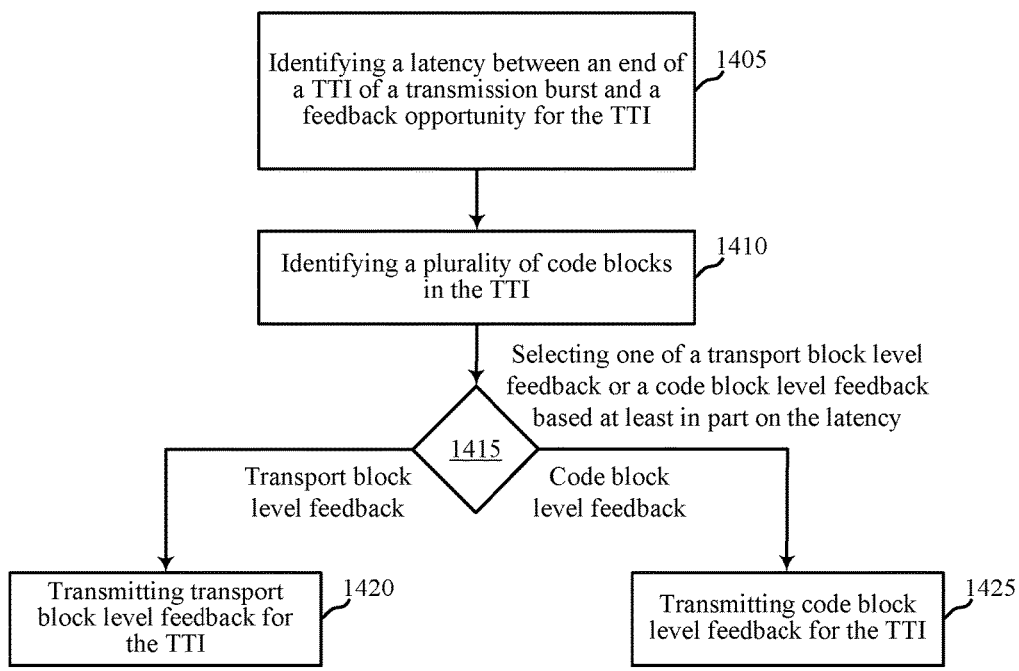
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to a wireless communication device including aspects of one or more of the base stations 105 or 905 described with reference to FIG. 1 or 9, aspects of one or more of the UEs 115 or 1015 described with reference to FIG. 1 or 10, or aspects of the apparatus 825 described with reference to FIG. 8. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1405, the method 1400 may include identifying a latency between an end of a TTI of a transmission burst and a feedback opportunity for the TTI. The operation(s) at block 1405 may be performed using the wireless communication manager 820, the base station wireless communication manager 960, or the UE wireless communication manager 1050 described with reference to FIG. 8, 9, or 10, or the TTI-to-feedback latency identifier 835 described with reference to FIG. 8.

At block 1410, the method 1400 may include identifying a plurality of code blocks in the TTI. The operation(s) at block 1410 may be performed using the wireless communication manager 820, the base station wireless communication manager 960, or the UE wireless communication manager 1050 described with reference to FIG. 8, 9, or 10, or the TTI code block identifier 840 described with reference to FIG. 8.

At block 1415, the method 1400 may include selecting one of a transport block level feedback or a code block level feedback for the TTI based at least in part on the latency. In some examples, the transport block level feedback or the code block level feedback may be selected based at least in part on comparing the latency to a threshold latency. When the latency satisfies the threshold latency (e.g., when the latency is greater than the threshold latency), the transport block level feedback may be selected. When the latency does not satisfy the threshold latency (e.g., when the latency is less than or equal to the threshold latency), the code block level feedback may be selected. The operation(s) at block 1415 may be performed using the wireless communication manager 820, the base station wireless communication manager 960, or the UE wireless communication manager 1050 described with reference to FIG. 8, 9, or 10, or the TTI feedback selector 845 described with reference to FIG. 8.

At block 1420 or block 1425, the method 1400 may include transmitting the selected one of the transport block level feedback or the code block level feedback for the TTI during the feedback opportunity. At block 1420, and when transport block level feedback is selected at block 1415, the method 1400 may include transmitting transport block level feedback for the TTI. The operation(s) at block 1420 may be performed using the wireless communication manager 820, the base station wireless communication manager 960, or the UE wireless communication manager 1050 described with reference to FIG. 8, 9, or 10, or the feedback transmission manager 850 or transport block level feedback manager 855 described with reference to FIG. 8.

At block 1425, and when code block level feedback is selected at block 1415, the method 1400 may include transmitting code block level feedback for the TTI. In some examples, transmitting code block level feedback may include transmitting a default acknowledgement or a default non-acknowledgement of at least one code block that is not processed in time to report feedback during the feedback opportunity. In some examples, transmitting code block level feedback may include transmitting an acknowledgement or a non-acknowledgement for a first set of one or more code blocks that is not processed in time to report feedback during the feedback opportunity. The acknowledgement or non-acknowledgement may be based at least in part on an acknowledgement or non-acknowledgement of at least one code block that is processed in time to report feedback during the feedback opportunity. The operation(s) at block 1425 may be performed using the wireless communication manager 820, the base station wireless communication manager 960, or the UE wireless communication manager 1050 described with reference to FIG. 8, 9, or 10, or the feedback transmission manager 850 or code block level feedback manager 860 described with reference to FIG. 8.

In some examples, the TTI may be a last TTI of the transmission burst. In some examples, the TTI may be other than the last TTI of the transmission burst. In some examples, the identifying, selecting, and transmitting operations of the method 1400 may be repeated for each of a plurality of TTIs in the transmission burst (or for each TTI in the transmission burst).

Thus, the method 1400 may provide for wireless communication. It should be noted that the method 1400 is just one implementation and that the operations of the method 1400 may be rearranged or otherwise modified such that other implementations are possible.

In some examples, aspects from two or more of the methods 1100, 1200, 1300, or 1400 described with reference to FIG. 11, 12, 13, or 14 may be combined. It should be noted that the methods 1100, 1200, 1300, and 1400 are just example implementations, and that the operations of the methods 1100, 1200, 1300, or 1400 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1X, 1X, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques.

These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication, comprising:
    identifying a latency between a start of a transmission time interval (TTI) of a transmission burst and a scheduled feedback opportunity for the TTI;
    determining a duration of the TTI of a transmission in the transmission burst, the duration including a number of symbol periods and being based at least in part on a time for feedback associated with the latency; and
    performing the transmission before the scheduled feedback opportunity for the TTI based at least in part on the determined duration of the TTI.

2. The method of claim 1, wherein the TTI comprises a last TTI of the transmission burst.

3. The method of claim 1, wherein the determining comprises:
    selecting the duration of the TTI based at least in part on the latency.

4. The method of claim 3, further comprising:
    determining the latency does not satisfy a threshold latency; and
    restricting the selecting, based at least in part on the latency not satisfying the threshold latency, to a subset of one or more durations less than a maximum TTI duration.

5. The method of claim 3, further comprising:
selecting at least one of a modulation and coding scheme (MCS) or a transport block (TB) size for the TTI independently of the duration of the TTI.

6. The method of claim 3, further comprising:
selecting at least one of an MCS or a TB size for the TTI based at least in part on the duration of the TTI.

7. The method of claim 3, further comprising:
capping an MCS or a TB size for the TTI based at least in part on the latency.

8. The method of claim 3, further comprising:
transmitting at least one of a control channel or a reference signal for the TTI during a preceding TTI of the transmission burst.

9. The method of claim 3, further comprising:
repeating the identifying and the selecting for each of a plurality of TTIs in the transmission burst.

10. The method of claim 9, wherein a first restricted duration is selected for a first TTI in the plurality of TTIs and a second restricted duration is selected for a second TTI in the plurality of TTIs, the first restricted duration differing from the second restricted duration.

11. The method of claim 1, wherein the determined duration comprises an expected duration of the TTI, the method further comprising:
identifying an actual duration of the TTI; and
modifying feedback for the TTI when the latency does not satisfy a threshold latency and the actual duration of the TTI is greater than the expected duration of the TTI.

12. The method of claim 11, further comprising:
monitoring at least one of a control channel or scheduling information received from a base station;
wherein the actual duration of the TTI is identified based at least in part on the monitoring.

13. The method of claim 11, wherein modifying feedback for the TTI comprises:
refraining from transmitting feedback for the TTI during the feedback opportunity.

14. An apparatus for wireless communication, comprising:
means for identifying a latency between a start of a transmission time interval (TTI) of a transmission burst and a scheduled feedback opportunity for the TTI;
means for determining a duration of the TTI of a transmission in the transmission burst, the duration including a number of symbol periods and being based at least in part on a time for feedback associated with the latency; and
means for performing the transmission before the scheduled feedback opportunity for the TTI based at least in part on the determined duration of the TTI.

15. The apparatus of claim 14, wherein the TTI comprises a last TTI of the transmission burst.

16. The apparatus of claim 14, wherein the means for determining comprises:
means for selecting the duration of the TTI based at least in part on the latency.

17. The apparatus of claim 16, further comprising:
means for determining the latency does not satisfy a threshold latency; and
means for restricting the selecting, based at least in part on the latency not satisfying the threshold latency, to a subset of one or more durations less than a maximum TTI duration.

18. The apparatus of claim 16, further comprising:
means for selecting at least one of a modulation and coding scheme (MCS) or a transport block (TB) size for the TTI independently of the duration of the TTI.

19. The apparatus of claim 16, further comprising:
means for repeating the identifying and the selecting for each of a plurality of TTIs in the transmission burst.

20. The apparatus of claim 14, wherein the determined duration comprises an expected duration of the TTI, the apparatus further comprising:
means for identifying an actual duration of the TTI; and
means for modifying feedback for the TTI when the latency does not satisfy a threshold latency and the actual duration of the TTI is greater than the expected duration of the TTI.

21. An apparatus for wireless communication, comprising:
a processor; and
memory coupled to the processor, wherein the processor is configured to:
identify a latency between a start of a transmission time interval (TTI) of a transmission burst and a scheduled feedback opportunity for the TTI;
determine a duration of the TTI of a transmission in the transmission burst, the duration including a number of symbol periods and being based at least in part on a time for feedback associated with the latency; and
perform the transmission before the scheduled feedback opportunity for the TTI based at least in part on the determined duration of the TTI.

22. The apparatus of claim 21, wherein the TTI comprises a last TTI of the transmission burst.

23. The apparatus of claim 21, wherein the determining comprises:
selecting the duration of the TTI based at least in part on the latency.

24. The apparatus of claim 23, wherein the processor is configured to:
determine the latency does not satisfy a threshold latency; and
restrict the selecting, based at least in part on the latency not satisfying the threshold latency, to a subset of one or more durations less than a maximum TTI duration.

25. The apparatus of claim 23, wherein the processor is configured to:
select at least one of a modulation and coding scheme (MCS) or a transport block (TB) size for the TTI independently of the duration of the TTI.

26. The apparatus of claim 23, wherein the processor is configured to:
repeat the identifying and the selecting for each of a plurality of TTIs in the transmission burst.

27. The apparatus of claim 21, wherein the determined duration comprises an expected duration of the TTI, and wherein the processor is configured to:
identify an actual duration of the TTI; and
modify feedback for the TTI when the latency does not satisfy a threshold latency and the actual duration of the TTI is greater than the expected duration of the TTI.

28. A method for wireless communication, comprising:
identifying a latency between an end of a transmission time interval (TTI) of a transmission burst and a feedback opportunity for the TTI;
identifying a plurality of code blocks in the TTI;
selecting one of a transport block level feedback or a code block level feedback for the TTI based at least in part on the latency; and transmitting the selected one of the transport block level feedback or the code block level feedback for the TTI during the feedback opportunity.

29. The method of claim 28, wherein the code block level feedback is selected, and wherein transmitting the code block level feedback for the TTI during the feedback opportunity comprises:
   transmitting a default acknowledgement or a default non-acknowledgement of at least one code block that is not processed in time to report feedback during the feedback opportunity.

30. The method of claim 28, wherein the code block level feedback is selected, and wherein transmitting the code block level feedback for the TTI during the feedback opportunity comprises:
   transmitting an acknowledgement or a non-acknowledgement for a first set of one or more code blocks that is not processed in time to report feedback during the feedback opportunity, wherein the acknowledgement or non-acknowledgement is based at least in part on an acknowledgement or non-acknowledgement of at least one code block that is processed in time to report feedback during the feedback opportunity.

* * * * *